US010663185B2

(12) United States Patent
Maruyama et al.

(10) Patent No.: US 10,663,185 B2
(45) Date of Patent: May 26, 2020

(54) FORECAST-BASED AUTOMATIC SCHEDULING OF A DISTRIBUTED NETWORK OF THERMOSTATS WITH LEARNED ADJUSTMENT

(71) Applicant: EnerAllies, Inc., Sunnyvale, CA (US)

(72) Inventors: Stephen C. Maruyama, Aptos, CA (US); Robert S. Keil, Los Altos, CA (US)

(73) Assignee: ENERALLIES, INC., Sunnyvale, CA (US)

( * ) Notice: Subject to any disclaimer, the term of this patent is extended or adjusted under 35 U.S.C. 154(b) by 97 days.

(21) Appl. No.: 15/636,361

(22) Filed: Jun. 28, 2017

(65) Prior Publication Data

US 2018/0010818 A1    Jan. 11, 2018

Related U.S. Application Data

(60) Provisional application No. 62/359,274, filed on Jul. 7, 2016.

(51) Int. Cl.
*F24F 11/30* (2018.01)
*G05B 15/02* (2006.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
CPC ........ F24F 11/30; F24F 11/62; F24F 2110/10; F24F 11/61; F24F 2130/00;
(Continued)

(56) References Cited

U.S. PATENT DOCUMENTS

| 2013/0184885 A1* | 7/2013 | Keil ...................... G05B 19/02 700/291 |
| 2014/0058567 A1* | 2/2014 | Matsuoka .......... G05D 23/1917 700/276 |

(Continued)

*Primary Examiner* — Jigneshkumar C Patel
(74) *Attorney, Agent, or Firm* — Hickman Palermo Becker Bingham LLP; Christine E. Orich

(57) ABSTRACT

Heating and cooling systems at various geographical locations are controlled by a central energy management service unit to maintain comfortable indoor temperatures. In some weather conditions, people may intuitively prefer a slightly warmer or cooler indoor temperature. In systems equipped with environmental learning capabilities, an apparent outdoor temperature is determined based on the geographic location itself, the season at the geographic location, the forecasted actual temperature, and one or more seasonal weather factors such as wind velocity or humidity. The apparent temperature and a trained machine learning system are used to select an automated schedule for the geographic location to be directly transmitted to devices at the location. The automated schedule can vary from typical schedules by causing the heating and cooling systems to maintain a temperature that is slightly warmer or cooler than typical indoor temperatures.

24 Claims, 8 Drawing Sheets

(51) Int. Cl.
  *F24F 11/62*     (2018.01)
  *G05B 19/042*    (2006.01)
  *F24F 11/61*     (2018.01)
  *F24F 130/10*    (2018.01)
  *F24F 110/10*    (2018.01)
  *F24F 130/00*    (2018.01)

(52) U.S. Cl.
  CPC .......... *G05B 19/0426* (2013.01); *F24F 11/61* (2018.01); *F24F 2110/10* (2018.01); *F24F 2130/00* (2018.01); *F24F 2130/10* (2018.01); *G05B 2219/2614* (2013.01)

(58) Field of Classification Search
  CPC . F24F 2130/10; G05B 15/02; G05B 19/0426; G05B 2219/2614
  USPC ........................................................ 700/276
  See application file for complete search history.

(56) References Cited

U.S. PATENT DOCUMENTS

| | | | |
|---|---|---|---|
| 2015/0025693 A1* | 1/2015 | Wu ..................... | G05D 23/1919 700/278 |
| 2015/0105918 A1* | 4/2015 | Lee ..................... | F24F 19/1084 700/276 |
| 2015/0168003 A1* | 6/2015 | Stefanski ................. | F24F 11/70 165/237 |

* cited by examiner

SUMMER SCHEDULE 1: APPARENT TEMPERATURE RANGING FROM 80 °F - 90 °F

| TIME OF DAY 608 | HEATING SETPOINT 610 | COOLING SETPOINT 612 |
|---|---|---|
| 7:00AM | 68 DEGREES | 72 DEGREES |
| 12:00PM | 70 DEGREES | 74 DEGREES |
| 6PM | 55 DEGREES | 90 DEGREES |

SUMMER SCHEDULE 2: APPARENT TEMPERATURE RANGING FROM 90 °F - 100 °F

| TIME OF DAY 608 | HEATING SETPOINT 610 | COOLING SETPOINT 612 |
|---|---|---|
| 7:00AM | 70 DEGREES | 74 DEGREES |
| 12:00PM | 72 DEGREES | 76 DEGREES |
| 6PM | 55 DEGREES | 90 DEGREES |

WINTER SCHEDULE 1: APPARENT TEMPERATURE RANGING FROM 60 °F - 70 °F

| TIME OF DAY 608 | HEATING SETPOINT 610 | COOLING SETPOINT 612 |
|---|---|---|
| 7:00AM | 66 DEGREES | 70 DEGREES |
| 12:00PM | 68 DEGREES | 72 DEGREES |
| 6PM | 55 DEGREES | 90 DEGREES |

WINTER SCHEDULE 2: APPARENT TEMPERATURE RANGING FROM 50 °F - 60 °F

| TIME OF DAY 608 | HEATING SETPOINT 610 | COOLING SETPOINT 612 |
|---|---|---|
| 7:00AM | 64 DEGREES | 68 DEGREES |
| 12:00PM | 68 DEGREES | 72 DEGREES |
| 6PM | 55 DEGREES | 90 DEGREES |

FIG. 6

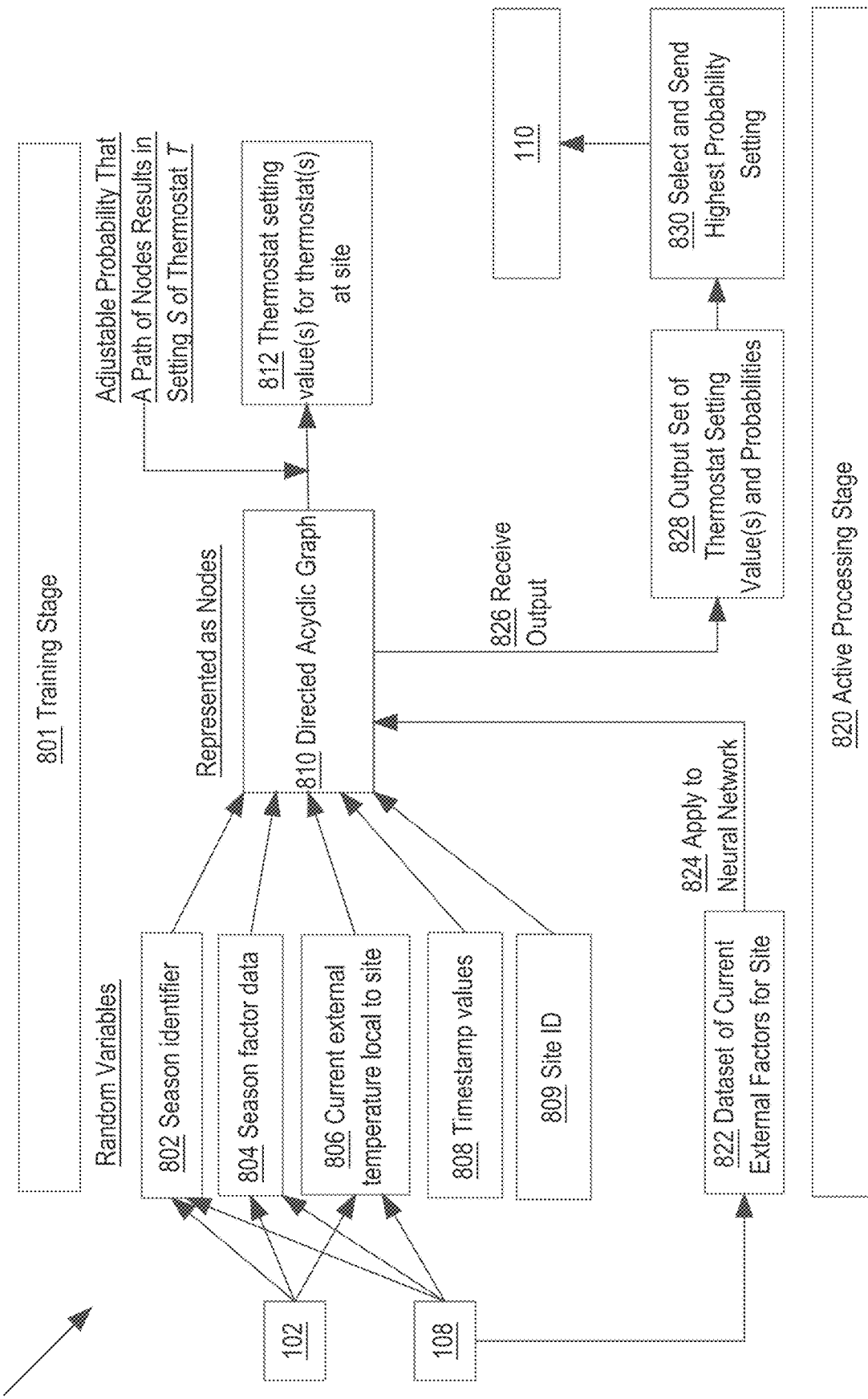

FORECAST-BASED AUTOMATIC SCHEDULING OF A DISTRIBUTED NETWORK OF THERMOSTATS WITH LEARNED ADJUSTMENT

CROSS-REFERENCES TO RELATED APPLICATIONS

This application claims the benefit of and priority to U.S. Provisional Patent Application Ser. No. 62/359,274, filed Jul. 7, 2016, which is incorporated herein by this reference in its entirety.

TECHNICAL FIELD

The present disclosure generally relates to energy management computer programs, computer systems, and computer-assisted solutions. The disclosure relates more specifically to a networked, cloud-based energy management computer system that provides for centralized management and control of multiple energy management devices located at a plurality of sites, and forecast-based scheduling of thermostats managed by the multiple energy management devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Energy costs typically represent one of the largest ongoing expenses associated with a business enterprise's commercial leases. As a result, business enterprises and other institutions are increasingly looking to some form of automated energy management solution in an attempt to monitor and reduce costs associated with energy usage at commercially operated sites, while still maintaining the premises at temperature levels that are appropriate for workers and the then-current weather, climate and/or season.

For business enterprises such as small footprint retail and food service chains that may operate a large number of sites across a wide geographic area, past energy management solutions have had serious shortcomings. For example, according to industry studies, only a small percentage of small footprint commercial sites are automated with a computer-based energy management system. Instead, the vast majority of commercial sites are equipped with outdated manual or programmable thermostats that typically require configuration and management by a local site manager or other employees. However, a typical site manager is often saddled with a variety of other job responsibilities that leave few resources to properly configure and manage thermostats and other energy management devices for optimal energy usage. The financial implications of this mismanagement are potentially considerable, particularly for enterprises that control hundreds or thousands of sites.

Of the commercial sites that have an energy management system, these systems are typically implemented as costly, custom-designed solutions that target individual site locations and are often bundled with expensive professional services to maintain the systems. The prior energy management approaches have been a poor fit for business enterprises that manage a large number of small footprint sites by failing to provide a scalable energy management system that provides centralized control of an enterprise's energy management devices across multiple sites, and that enables valuable analysis and insight into an enterprise's energy usage across site boundaries in order to optimize energy usage.

Further, these systems fail to account for weather conditions other than temperature that can affect people's perception of the temperature. Changing seasons or other weather conditions can cause people to perceive the same indoor temperature as too hot or too cold. People then react by manually adjusting thermostats, thus reducing an energy savings attributable to the energy management system. Some programmable thermostats can use user interactions with the thermostat to implement behavioral learning.

SUMMARY

The appended claims may serve as a summary of the invention.

BRIEF DESCRIPTION OF THE DRAWINGS

In the drawings:

FIG. 6 depicts example automated schedules for a thermostat from which a transmitted automated schedule may be selected.

FIG. 8 illustrates data structures and data processing steps representing an algorithm that may be programmed to implement a neural network embodiment of the behavioral learning module.

DETAILED DESCRIPTION

Figure 1:
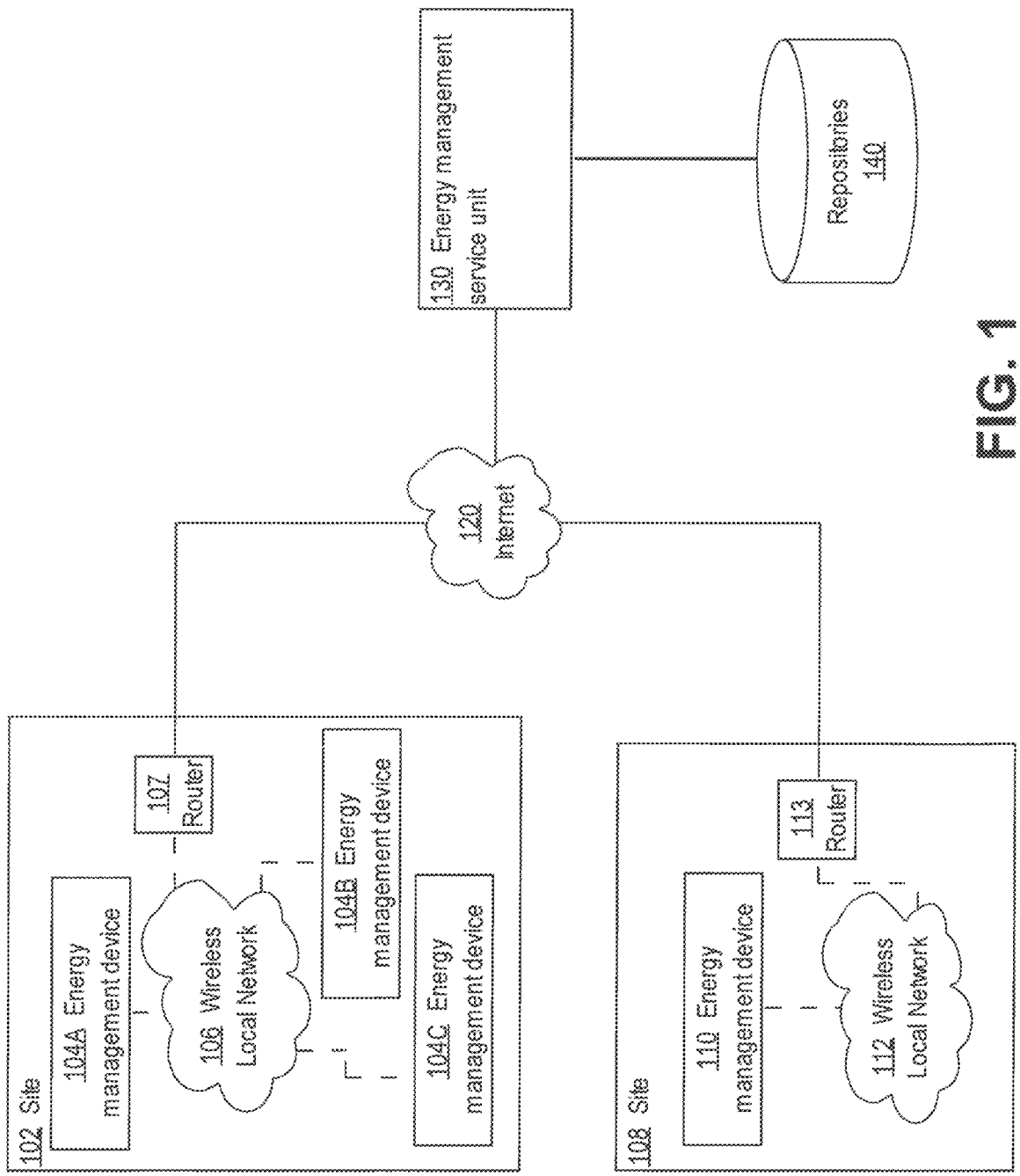
FIG. 1 is a block diagram that illustrates an overview of an energy management system that includes an energy management service unit in relation to a plurality of sites that each include one or more energy management devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural and Functional Overview
   3.0 Example Implementation of Energy Management System
      3.1 Energy Management Devices
      3.2 Energy Management Platform 3.2.1 Data Collection
3.2.2 Energy Management Portal
3.2.3 Site Groupings
3.2.4 Energy Management Applications
4.0 Environmental Learning
4.1 Weather Data Acquisition
4.2 Apparent Temperature Calculation
4.3 Selection of Automated Schedule
4.4 Transmission of Automated Schedule to Thermostats
5.0 Implementation Mechanisms—Hardware Overview
1.0 General Overview According to some embodiments, a data processing system, comprises: an energy management service unit comprising a computer and a network interface that is configured to be coupled using a data network to a plurality of energy management devices located at a plurality of different geographically distributed sites, each of the sites having a different energy management device; an analytics module in the energy management service unit that is programmed to obtain, via the network, a plurality of weather data from a plurality of different weather computers that are at locations relating to the sites, and including at least first weather data of a location relating to a first site of the plurality of sites and comprising one or more temperature values, and programmed to determine, based on the first weather data, an apparent temperature of the first site; an automated control module in the energy management service unit that is programmed to select, from computer memory storing a plurality of digital automated schedules, a first automated schedule based on the apparent temperature and a season value indicating a season at the first site, and to electronically transmit the first automated schedule to a first energy management device of the plurality of energy management devices at the first site.

According to some embodiments, the analytics module is programmed to obtain current weather data at the first site as part of the first weather data.

According to some embodiments, the analytics module is programmed to obtain weather forecast data indicating a weather forecast at the first site as part of the first weather data. According to some embodiments, the analytics module is programmed to determine, based on the weather forecast data, a plurality of apparent temperatures at the first site; wherein the automated control module is programmed to select, from the memory, one or more second digital automated schedules based on one or more second apparent temperatures of the plurality of apparent temperatures and one or more second season values specifying one or more second seasons at the first site and to electronically transmit the one or more second automated schedules to the first energy management device of the plurality of energy management devices at the first site. According to some embodiments, the automated control module is programmed to determine, from the weather forecast data, a time of change from the apparent temperature to the one or more second apparent temperatures, to generate program instructions that instruct the first energy management device to use the first automated schedule until the time of change and to use the one or more second automated schedule after the time of change, and to electronically transmit the program instructions to the first energy management device.

According to some embodiments, the analytics module is programmed to obtain data indicative of temperature or wind velocity or precipitation or cloud cover or humidity or season or sunrise or sunset as part of the weather data.

According to some embodiments, the analytics module is programmed to determine the apparent temperature based on data indicative of temperature and wind velocity in combination with any of humidity or precipitation or snowfall or cloud cover.

According to some embodiments, the analytics module is programmed to determine the apparent temperature based on data indicative of temperature and humidity in combination with any of wind velocity or precipitation or snowfall or cloud cover.

According to some embodiments, the first automated schedule comprises a plurality of times of day, and both a heating setpoint value and a cooling setpoint value in association with each of the times of day.

According to some embodiments, the plurality of automated schedules comprise at least two automated schedules for each season at the first site.

According to some embodiments, a data processing method, comprises: using an analytics module in an energy management service unit that comprises a computer and a network interface that is configured to be coupled using a data network to a plurality of energy management devices located at a plurality of different geographically distributed sites, each of the sites having a different energy management device, obtaining, via the network, a plurality of weather data from a plurality of different weather computers that are at locations relating to the sites, and including at least first weather data of a location relating to a first site of the plurality of sites and comprising one or more temperature values, and determining, based on the first weather data, an apparent temperature of the first site; using an automated control module in the energy management service unit, selecting, from computer memory storing a plurality of digital automated schedules, a first automated schedule based on the apparent temperature and a season value indicating a season at the first site, and electronically transmitting the first automated schedule to a first energy management device of the plurality of energy management devices at the first site.

According to some embodiments, the method further comprises, using the analytics module, obtaining current weather data at the first site as part of the first weather data.

According to some embodiments, the method further comprises, using the analytics module, obtaining weather forecast data indicating a weather forecast at the first site as part of the first weather data. According to some embodiments, the method further comprises, using the analytics module, determining, based on the weather forecast data, a plurality of apparent temperatures at the first site; using the automated control module, selecting, from the memory, a second digital automated schedule based on a second apparent temperature of the plurality of apparent temperatures and a second season value specifying a second season at the first site and to electronically transmit the second automated schedule to the first energy management device of the plurality of energy management devices at the first site. According to some embodiments, the method further comprises, using the automated control module, determining, from the weather forecast data, a time of change from the apparent temperature to the second apparent temperature, generating program instructions that instruct the first energy management device to use the first automated schedule until the time of change and to use the second automated schedule after the time of change, and electronically transmitting the program instructions to the first energy management device.

According to some embodiments, the method further comprises, using the analytics module, obtaining data indicative of temperature or wind velocity or precipitation or humidity or season or sunrise or sunset or snowfall or cloud cover as part of the weather data.

According to some embodiments, the method further comprises, using the analytics module, determining the apparent temperature based on at least temperature and wind velocity.

According to some embodiments, the method further comprises, using the analytics module, determining the apparent temperature based on at least temperature and humidity.

According to some embodiments, the first automated schedule comprises a plurality of times of day, and both a heating setpoint value and a cooling setpoint value in association with each of the times of day.

According to some embodiments, the plurality of automated schedules comprises at least two automated schedules for each season at the first site.

2.0 Structural and Functional Overview

One embodiment provides an energy management system based on a distributed computer-based architecture that includes networked energy management devices located at a plurality of sites and a collection of energy management computer program applications and modules implemented by a centralized energy management service unit. In an embodiment, the energy management program applications and modules are responsible for facilitating customer access to the system and collecting, storing, and analyzing energy management data collected from the devices at the plurality of sites. In an embodiment, the energy management system is adaptable to a wide variety of energy usage requirements and enables customers accessing the system to configure energy management devices using scheduling templates, to define and customize site groupings for device configuration and data analysis purposes, and to request and view various statistical views of collected energy usage data.

In this context, energy management devices are devices that are configured to control and/or monitor one or more energy consuming commercial appliances such as, for example, heating, ventilation, and air conditioning (HVAC) units, lighting units, water pumps, and refrigeration units. In various embodiments, energy management devices may include any of programmable thermostats, power outlet control devices, lighting control devices, refrigeration control devices, motion detection devices, sub-metering devices, water resource management devices, waste management devices, renewable energy management devices, and any combination thereof. In an embodiment, the energy management devices are configured to collect data relating to energy usage or other operating conditions associated with an appliance under the device's control and to send the data to a centralized energy management service unit.

In an embodiment, one or more of the energy management devices may comprise a programmable wireless communications subsystem that enables the devices to communicate with the centralized energy management service unit over one or more wireless or wireline communications networks. In an embodiment, the programmable wireless communications subsystem is implemented using the Wi-Fi wireless communication standard. The use of the Wi-Fi wireless standard in energy management devices provides numerous benefits such as, for example, enabling the devices to wirelessly connect to the Internet without a dedicated gateway device. These and other factors may significantly decrease the costs of system implementation.

In an embodiment, a centralized energy management service unit is coupled to an internetwork or wide area network and is configured to provide a World Wide Web-based management interface, or portal, that enables users to securely access and configure various aspects of the system. For example, users may interact with the portal to configure site groupings, define device scheduling templates, and request various statistical views of collected energy usage data for display in one or more dashboard-like interfaces. The energy management service unit is configured so that, based on various user profiles, the portal may securely control access to application programs and stored energy management data to various users within a customer company, to third-party users that may have a business relation with one or more customers, and to users associated with different customers, who may be competitors. In one embodiment, the energy management service unit may include an application programming interface (API) that enables third-party users to access controlled views of collected energy usage data.

FIG. 1 is a block diagram that illustrates an overview of an energy management system that includes an energy management service unit in relation to a plurality of sites that each includes one or more energy management devices. In this context, a site generally refers to a small footprint building such as a retail store or other commercial building controlled by a customer of the energy management system provider. In an embodiment, sites 102, 108 are coupled through routers 107, 113, respectively, to the Internet 120, and through the Internet 120 to an energy management service unit 130.

In an embodiment, site 102 comprises one or more energy management devices wirelessly coupled to a wireless local network 106 that has connectivity to the Internet 120. For example, site 102 includes three energy management devices 104A, 104B, 104C. Each of energy management devices 104A, 104B, 104C may represent a different type of energy management device, or may represent the same type of energy management device as another device located in a different area of site 102. Each of the energy management devices 104A, 104B, 104C may communicate over wireless local network 106 using wireless connections such as, for example, using the Wi-Fi communication standard. For example, router 107 may comprise a wireless access point that facilitates communication between any wireless energy management devices and the Internet 120. In some embodiments router 107 may be the same router that is used for communication with other computer devices at the site, such as point of sale terminals, inventory computers, or special-purpose computers; in other words, embodiments of the systems and solutions described herein do not require a dedicated router, but can use available bandwidth of a router that is already installed at the site for other purposes.

Unlike prior approaches, the networked connection of the energy management service unit 130 to the devices 104A, 104B, 104C is direct, meaning that it does not pass through a separate building management system (BMS). The use of a BMS is commonplace in some commercial implementations of environmental control systems but has the disadvantage of interposing a source of latency in communications, and policy filtering, that the present solution seeks to avoid. In the embodiments herein, as other sections will describe in more detail, the energy management unit 130 is programmed to facilitate determining temperature control practices for devices 104A, 104B, 104C, 110 based upon different perceptions of temperature and different conditions at sites 102, 108, to determine temperature adjustment practices based on machine learned data representing behavior of the devices, to build a database of records reflecting locally optimal data and optionally site feedback from users, and to forecast a schedule of temperature adjustments for the devices based on the machine learning. Localized data, patterns, and automation practices are learned based on differences in the times of year and adjustments that are made locally to geographically dispersed sites 102, 108. Simply stated, the concept of comfort, in terms of temperature at different times of the day or different times of the year, may differ significantly at site 102 as compared to site 108 based upon, for example, the then-current outside temperature and local preferences for indoor temperature that is considered comfortable. Because of the sophistication and complexity of these calculations, it would be undesirable and unnecessary for commands from the energy management unit 130 directed to the devices 104A, 104B, 104C, 110 to be intercepted, inspected, and possibly filtered, modified or blocked by a separate BMS, or to require special command syntax, message structure, or other electronic protocols demanded by the BMS. Moreover, commercial installations of the techniques disclosed herein do not include or cannot provide a BMS. Examples include geographically distributed small business locations such as restaurants or other retail stores.

In an embodiment, one or more wireless energy management devices at site 102 may be configured to communicate directly with one or more other energy management devices. For example, one or more of energy management devices 104A, 104B, 104C may be configured to communicate directly with other devices using the Wi-Fi Direct protocol or other similar peer-to-peer communication standard. While certain embodiments are described in connection with wireless communication, wired communication or a combination may be used in other embodiments. Direct communication between devices may enable the addition of energy management devices at more locations within site 102 resulting in more detailed energy usage data collection.

Similar to site 102, site 108 includes an energy management device 110. Energy management device 110 is coupled to wireless local network 112 that has connectivity to the Internet 120. Site 108 may be located in a geographically remote location from site 102. For the purposes of illustrating a clear example, FIG. 1 shows only two sites and four energy management devices; however, practical embodiments may include any number of sites and any number of energy management devices located at each site.

Internet 120 may comprise a plurality of public internetworks providing connectivity between sites 102, 108 and energy management device 110. In an embodiment, Internet 120 may comprise a private point-to-point connection of a site to the energy management service unit 130. For example, a client computing device located at site 102 could use the public Internet to connect to energy management service unit 130 for system configuration and reporting purposes, but a private point-to-point connection may be provided for the collection of data from energy management devices 104A-104C. For example, a point-to-point connection could be implemented using an Internet Protocol Security (IPsec) network tunnel or other mechanism providing a secure connection over which collected data may be transmitted. In an embodiment, the secure connection may be made compliant with the Payment Card Industry (PCI) security standards such that the collected data may be transmitted over the same network elements and through network firewalls used by various sites to securely transmit credit cardholder information.

Energy management service unit 130 comprises an energy management platform and a collection of energy management applications and modules, each of which is detailed in other sections below. In general, the energy management applications and modules of energy management service unit 130 are configured to perform energy management device data collection, enable customers to access and manage the energy management system, and provide analysis of collected energy management data.

In an embodiment, energy management service unit 130 is coupled to data repositories 140 which stores collected energy management data, externally collected data, user information, site groupings, scheduling templates, and other data elements utilized by energy management service unit 130 as further described herein. Repositories 140 broadly represent one or more data repositories and various divisions of data collected and stored by the system may be implemented in different embodiments.

3.0 Example Implementation of Energy Management System

Figure 2:
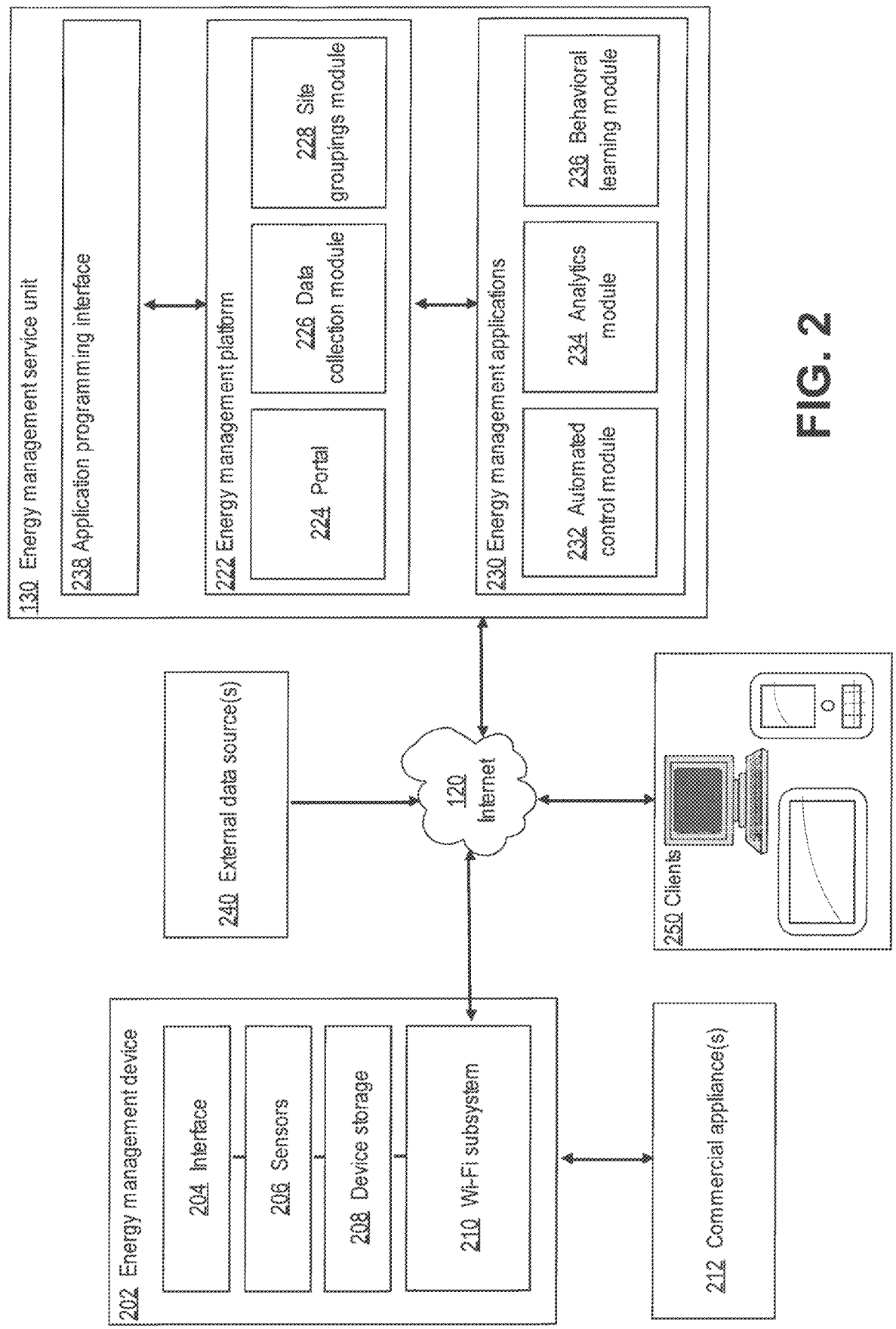
FIG. 2 is a block diagram that illustrates one embodiment of an energy management architecture including an example energy management device and an energy management service unit.

FIG. 2 is a block diagram that illustrates one embodiment of an energy management computer architecture including an example energy management device and an energy management service unit. The various components of FIG. 2 illustrate a system architecture that includes computerized, intelligent energy management devices such as energy management device 202, an energy management platform 222, and a collection of energy management applications 230 that provide for a comprehensive energy management system. Each of energy management platform 222 and energy management applications 230 may be implemented, in various embodiments, as one or more computer programs, code segments, scripts, configuration files, firmware, hardware logic, special-purpose computers, or a combination thereof.

3.1 Energy Management Devices

Referring now to FIG. 2, in an embodiment, energy management device 202 represents an example device that may be deployed at a particular site, so that all devices at the site could be similarly structured, in one embodiment. In an embodiment, an energy management device 202 may comprise an interface 204, one or more sensors 206, device storage 208, and a Wi-Fi subsystem 210. In an embodiment, an energy management device 202 may be mechanically, electrically, or communicatively coupled to one or more commercial appliances 212 for the purposes of controlling the operation of the appliances and/or collecting operating information associated with the appliances to send to energy management service unit 130. The particular approach for coupling, controlling and collecting are not critical.

In an embodiment, interface 204 provides user access to various configuration settings and operating information associated with an energy management device 202 directly at the device. For example, interface 204 may comprise various interface controls that enable a user to configure one or more settings associated with one or more associated commercial appliances 212. Interface 204 may further comprise one or more displays that report operating information associated with commercial appliances 212. As an example, a commercial appliance 212 may be an HVAC unit and interface 204 may provide interface controls that enable a user to configure desired temperature setpoints and that display current temperature conditions and setpoints. Touchscreens, pushbuttons, and similar devices may be used as the interface 204.

In an embodiment, an energy management device 202 may include one or more device sensors 206. Sensors 206 may be configured to detect one or more external or internal conditions associated with the operation of an energy management device 202 or an associated commercial appliance 212. For example, a thermostat device may include one or more sensors 206 configured to detect current temperature and/or humidity conditions or other information associated with the performance of an associated HVAC system. As another example, sensors 206 in a lighting control device may be configured to detect and report current lighting settings in one or more associated lighting devices.

In an embodiment, an energy management device 202 comprises device storage 208. Device storage 208 may store local device configuration settings, scheduling templates, and data collected by sensors 206. Device storage 208 may provide a mechanism for persistent storage of configuration settings and other information in the event of a power failure or communications failure rendering energy management device 202 unable to communicate with energy management service unit 130. For example, in one embodiment, device storage 208 may comprise a flash memory storage chip or other form of persistent data storage.

In an embodiment, an energy management device 202 comprises a Wi-Fi subsystem 210. Wi-Fi subsystem 210 may include programmable logic that is configured to override and/or supplement firmware or other logic included in an energy management device 202. In an embodiment, the logic in Wi-Fi subsystem 210 may be configured to enable customized control of various aspects of an energy management device 202, to send and receive data from energy management service unit 130, or perform other functions that are not natively provided by energy management device 202.

In an embodiment, Wi-Fi subsystem 210 may comprise various components including a Wi-Fi radio, a processor, and computer memory. In one embodiment, the Wi-Fi subsystem 210 may be incorporated directly into an energy management device 202, or may be included as a separate plug-in device. For example, in one embodiment, Wi-Fi subsystem 210 may be a device conforming to the Utility Smart Network Access Port (USNAP) standard.

In an embodiment, Wi-Fi subsystem 210 is configured to communicate with energy management service unit 130 over the Internet 120, as described above. Communication between Wi-Fi subsystem 210 and energy management service unit may comprise sending energy usage data associated with a commercial appliance 212, sending data detected by sensors 206, and sending energy management device 202 usage and configuration settings. Wi-Fi subsystem 210 may also be configured to receive scheduling templates and other device configuration data from energy management service unit 130, as further described herein. For example, assuming energy management device 202 is a programmable thermostat, Wi-Fi subsystem 210 may be configured to periodically send data to energy management service unit 130 over the Internet 120 including current temperature setpoints, device programming and configuration settings, and other data related to the operation of energy management device 202 and/or a commercial appliance 212.

In an embodiment, a programmable thermostat may initially include firmware or other controllers that include logic to control interface 204 and other operations of the thermostat. In an embodiment, Wi-Fi subsystem 210 may include additional logic programmed to override and/or supplement various aspects of the device firmware logic including restricting user access to particular interface 204 controls and implementing other device configuration changes responsive to communication received from energy management service unit 130. In an embodiment, Wi-Fi subsystem 210 may be configured to receive and cause installation of updated device firmware.

For example, Wi-Fi subsystem 210 may include logic configured to send "last gasp" messages to energy management service unit 130 in the event of an energy management device 202 losing power. In another embodiment, Wi-Fi subsystem 210 may include logic that enables a remote user to manage device calibration and detect calibration errors associated with energy management device 202.

3.2 Energy Management Platform

In an embodiment, energy management service unit 130 comprises an energy management platform 222, energy management applications 230, and application programming interface (API) 238. In an embodiment, the energy management platform 222 comprises a portal 224, data collection module 226, and site groupings module 228, each module described further in the sections below. The modules illustrated in FIG. 2 are provided as examples, and energy management service unit 130 may comprise any number of additional modules including logging, system administration, and other modules or sub-modules.

3.2.1 Data Collection

In an embodiment, data collection module 226 comprises program code and other logic configured to collect and store data from energy management devices and other external data sources. For example, data collected from energy management devices may include energy usage data and energy management device operation and configuration data. Data collection module 226 may also collect and store data from one or more external data sources 240 including, for example, weather data, customer data, and utilities information. In an embodiment, data collection module 226 may store collected data in one or more databases accessible to other modules of energy management service unit 130.

In one embodiment, data collection may be initiated by logic included in an energy management device 202, as described above, the logic configured to periodically or continuously send data collected by the device to data collection module 226. In this manner, data collection module 226 may receive the data sent from the energy management devices and store the data in a data repository. The data received by data collection module 226 may be stored along with one or more identifiers that identify the particular device sending the data, the site at which the sending device is located, and a time the data is sent or received.

In another embodiment, data collection may be initiated by data collection module 226 by sending a collection request to an energy management device 202 at desired time intervals. An energy management device 202 may be configured an energy management device 202 may be configured, in response to receiving a collection request, to collect and transmit the requested data to data collection module 226. Data collection preferences may be defined, in an embodiment, as part of a scheduling template or other device configuration data stored on an energy management device 202 and/or configured by a user using portal 224.

In an embodiment, data collected from an energy management device 202 may include any number of status parameters detected by the device. For example, collected parameters may include temperatures, humidity, HVAC mode, HVAC status, heating and cooling setpoints, fan operation modes, energy saving modes, setpoint overrides, setpoint holds, and heartbeats.

In an embodiment, data collection module 226 may collect information from one or more external data sources 240. As an example, external data sources 240 may include a weather service that provides information such as current temperatures, daily maximum and minimum temperatures, precipitation, weather forecasts, and other weather related information. As another example, external data sources 240 may include data stored in a customer database such as, for example, utility billing information, utility tariff rates (including time of use rates), demand response program information and associated pricing information, and utility rebate program information. In another embodiment, external data sources 240 may include customer sales information, or other customer site-related information. In an embodiment, information collected from external data sources 240 may be used in conjunction with collected energy usage data to more accurately and advantageously program device templates for particular customers and to provide more detailed analyses of customer energy usage.

In an embodiment, data collection module 226, and other energy management service unit 130 modules, may interface with energy management devices using an application programming interface (services API) that implements particular energy management device functions. With this approach, energy management devices can be modified without affecting the modules at energy management service unit 130, and likewise, energy management service unit 130 may be modified without affecting logic implemented at the energy management devices.

3.2.2 Energy Management Portal

In an embodiment, energy management platform 222 comprises a graphical user interface and associated operating programs, termed portal 224, configured to generate and cause display of a management interface comprising one or more informational dashboards, configuration pages, and other interfaces that facilitate user interaction with the energy management system. In an embodiment, portal 224 may be accessed using a computer such as client machine 250. Client machine 250 may be located on the same local network as an energy management device 202, energy management service unit 130, or on any other network communicable with Internet 120.

In an embodiment, client 250 generally includes any computing device capable of requesting services over a network and includes, for example, personal computers, workstations, laptop computers, netbook computers, smartphones, and tablet computers. As an example, client 250 may comprise a browser that can access HTML documents generated by portal 224. In one embodiment, a client 250 may be integrated into an energy management device 202.

In one embodiment, portal 224 may generate displays that are customized for particular devices. For example, in response to requests for similar information, portal 224 may generate one display in response to detecting that client 250 is a smartphone, and a second display in response to detecting that client 250 is a personal computer. In an embodiment, the generation of informational dashboards, configuration pages, and other displays may be customized for more effective display depending on various characteristics of the client device including, for example, screen size and resolution, processing power, presence of a touch user interface, and connection bandwidth.

In one embodiment, portal 224 may control access to the energy management system based on user access credentials supplied by a user accessing portal 224. In an embodiment, each authorized user may be associated with a user profile that identifies the user's access level within the system. In an embodiment, a user's access level may include defining particular databases that the user may access and whether the user has permission to modify the data or read-only access.

In an embodiment, user profiles may be consistent with users' role in a company organization or other associated with other employment positions. For example, separate user profiles may be established for company executives, regional managers, site managers, or other classes of users. In other embodiments, other customized user profiles may be created for other purposes such as company-wide and system wide-administrators. As other examples, user profiles may be established for users associated with system support, HVAC installation and support, HVAC manufacturers, other users associated with retail or food services, users associated with a utility company, and other industry analysts. The association of users with particular user roles may be configured within a company by a corporate administrative user or by other designated system-wide administrative users.

For example, access levels may be configured such that a site manager may access information, device configurations, and analytics for the particular sites under the site manager's control, but not for the entire company. As another example, a regional manager may access information associated with a plurality sites that are associated with the manager's organizational responsibility. As yet another example, a corporate executive may access aggregated information of many companies in a geographic area or industry to analyze industry benchmarks.

In an embodiment, a user accessing portal 224 may define and configure various aspects of the energy management system in accordance with the user's profile and corresponding access levels. For example, a user may use portal 224 to configure one or more data collection configurations, scheduling templates, site groupings, statistical views, and other elements, as further described in other sections.

3.2.3 Site Groupings

In an embodiment, energy management service unit 130 comprises a site groupings module 228 responsible for implementing the creation and modification of site groupings. In this context, a site grouping is stored data representing a logical grouping of one or more physical, managed sites into a reusable collection that may be used for analysis, controlling user access, application of scheduling templates, and other system-wide purposes. In an embodiment, a site grouping may include any combination of sites and/or other defined site groupings. For example, one or more site groupings may be created that group sites located in each of a number of geographic regions, and a separate site grouping may be created that includes one or more of the geographic region site groupings. In an embodiment, site groupings may be configured by a user using portal 224 and configuration may include the user creating new site groupings, adding or removing one or more sites or other site groupings from an existing grouping, or deleting an existing grouping.

In an embodiment, site groupings may be created based on any number of characteristics including physical form, organizational or hierarchical structures used in non-energy management contexts, geographical regions, and associated users. For example, a corporate executive may desire to set up site groupings for tracking energy management spending for particular sites within the executive's company, grouped by various geographical regions and by regional managers that relate to sales, accounting, or other concepts. As another example, a site manager may desire tracking a site grouping that includes only the sites for which the site manager is responsible. Groups may be associated with financial concepts such as sales regions, territories, or other accounting units; geophysical entities or political units such as states, provinces, or countries; types of trade channels; demographic units; or any other grouping useful in management. Other examples of site grouping types that may be desired include site groupings associated with particular climate regions, particular utility regions, building types, store types (e.g., retail or food service), and HVAC manufacturers or models. For example, various utilities may have different energy usage pricing rates and the effect of the different pricing rates may be tracked across a number of site groupings. Different states may have different tariff rates that are tracked and compared by state site groupings. As another example, sites may be grouped based on climate types and may include sites that are located in disparate geographic regions but that share similar weather patterns.

In the examples, various site groupings may be created that include sites relevant to a users' configuration, monitoring, and/or reporting needs.

In an embodiment, for security and other reasons, site groupings module 228 may maintain stored, persistent associations between stored user profiles and site groupings. In an embodiment, associations between site groupings and user profiles may be configured by a user with sufficient access credentials using portal 224. In an embodiment, users also may have varying levels of access to their assigned groupings. For example, a particular user may be responsible for customer support of a particular region of the country. The user for example, may then be associated with a site grouping that includes one or more sites from multiple companies but because the customer support user is not directly associated with the company, read-only access permission may be given to the energy usage data collected from the sites. This may prevent the customer support user from making unauthorized changes to configurations of scheduling templates and other settings associated with the sites in a grouping.

In an embodiment, site groupings module 228 may enable users with sufficient access to create system configurations for an entire site grouping. For example, a user may associate customized scheduling templates and alarm and reporting configurations with a particular site grouping to which the user has access.

In an embodiment, site groupings module may store one or more default site groupings, such as a grouping that includes all sites within a company, or automatic groupings by states or other characteristics. In an embodiment, a user may create new site groupings, modifying existing site groupings, or remove existing site groupings, using portal 224. For example, a user creating a new site grouping may be presented with a listing of all sites that the user has access to and be able to select one or more of the sites to create a new site grouping. As another example, a user may view all existing site groupings associated with the user and be able to select new sites to add to a grouping or to remove sites from a grouping. The creation and modification of site groupings may be accomplished using any number of user interface controls including dragging and dropping visual representations of sites into groups or creating site grouping lists.

Figure 3:
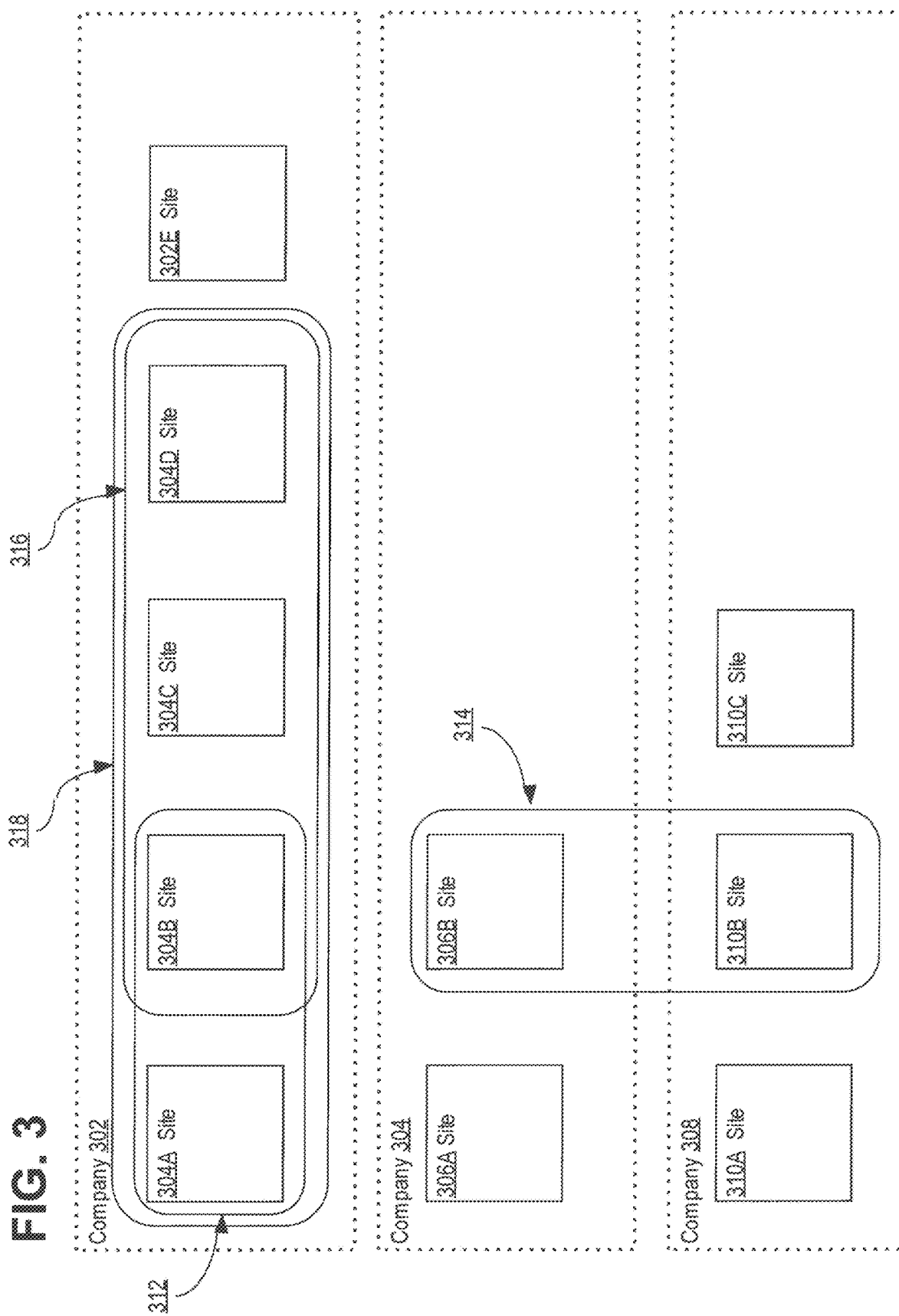
FIG. 3 is a block diagram that illustrates a representation of several example site groupings.

FIG. 3 is a block diagram that illustrates a representation of several example site groupings. Each of companies 302, 304, 308 may represent companies associated with different customers, different companies or company subsidiaries associated with the same customer, or any combination thereof.

Site groupings 312, 316, 318 represent three different site groupings within Company A. Site grouping 312 includes sites 302A, 302B, and may for example represent two sites for which a particular site manager is responsible. Alternatively, site groupings 312, 316 may represent two different regions that are overseen by two different regional managers. As shown by site 304B, a particular site may be included in any number of separate site groupings. For example, site 304B may be under the joint-responsibility of the regional manager responsible for site grouping 312 and the regional manager responsible for site grouping 316. Site grouping 318 illustrates a site grouping that includes two other site groupings, namely, site groupings 312, 316. In an embodiment, the system permits any arbitrary groupings of sites as fits customer requirements.

Site grouping 314 illustrates a site grouping that includes sites associated with each of companies 304, 308. For example, site grouping 314 may represent a grouping of sites that are located in a particular geographic region and that are under the responsibility of a third-party company responsible for servicing appliances at the selected sites. In the example, the third-party service company may be associated with grouping 314 and provided read-only access to the information in order to assess the need for service.

3.2.4 Energy Management Applications

Referring again to FIG. 2, in an embodiment, the energy management service unit 130 comprises various energy management applications 230 that interface with the energy management platform 222 components in order to provide automated control of customer energy management devices, analysis of collected data, and behavioral learning algorithms that leverage the data analysis to tune the operation of the system.

3.2.4.1 Automated Controls

In an embodiment, energy management service unit 130 comprises an automated control module 232 that operates in conjunction with site groupings module 228 to provide centralized configuration and control of a customer's energy management devices across any number of sites. In an embodiment, the automated control module 232 is configured to control energy management devices using one or more scheduling templates and to provide for the detection and reporting of various alarm conditions.

In one embodiment, automated control module 232 enables users to configure and deploy scheduling templates that control the operation of one or more energy management devices. In this context, a scheduling template refers to a configuration file or other data representation that defines one or more energy management device operating parameters to control the operation of one or more energy management devices. Example parameters include device operation settings based on a time of day, based on a yearly calendar, or based on a calendar following weekday, weekend, and holiday schedules. For example, a scheduling template for a thermostat device may define operating parameters that enable changing temperature cooling and heating setpoints, control fan operation, HVAC mode (heating, cooling, auto, and other modes), energy saving modes, setpoint holds, and device operation schedules. As another example, a scheduling template for a lighting control device may define schedules dictating when lights are to be powered on and off and associated lighting levels.

In an embodiment, a user may create, modify, and cause scheduling templates to be deployed to energy management devices using portal 224. For example, portal 224 may include a scheduling template configuration interface that enables users to specify desired scheduling template parameters and cause the configured scheduling templates to be deployed to one or more energy management devices. In an embodiment, a user may associate a particular scheduling template with an individual energy management device at a particular site, with all devices at a site, with sites in one or more site groupings, or across all devices within entire company. In an embodiment, a user may associate scheduling templates with areas within a particular site such as, for example, one scheduling template for energy management devices in a kitchen area, and another scheduling template for energy management devices in a dining room area. In an embodiment, logic in a Wi-Fi subsystem 210 is configured to receive scheduling templates sent from energy management service unit 130 and cause the scheduling template parameters to be implemented by energy management device 202.

In an embodiment, templates may also include feature templates. Feature templates may specify one or more particular device features that are available at a particular device, at devices within one or more sites, or at devices within one or more site groupings. In another embodiment, templates may include alarm templates that specify one or more alarms that are supported by a particular device, within one or more sites, or within one or more site groupings.

In some embodiments, templates may include templates that are based on user roles. The user roles templates specify access privileges that are assigned to particular end user devices or end user login accounts in order to control access to the energy management system functionality.

In some embodiments, templates may include forecast schedule templates. Forecast schedule templates define customers, groups, locations and/or devices that are associated with a particular forecast schedule. In other words, a forecast schedule template can be applied to, for instance, all sites of a particular customer, a group of customers, a particular site, or a device. An example specification for the forecast schedule template includes data elements, such as the name of the template, a date range or season in which the template applies, and a set of rules, such as:
If forecast apparent temperature is <x download schedule −>schedule 1;
If forecast apparent temperature is >=x and <=y download schedule 2;
If forecast apparent temperature is >y download schedule 3; where x and y are data values representing threshold apparent temperatures. The forecast schedule template functions in a similar manner to other scheduling templates as described above.

In an embodiment, automated control module 232 may include monitoring logic that detects if a deployed scheduling template has been over ridden at a local device. For example, a scheduling template with particular parameters may be deployed to an energy management device 202, and those particular parameters may be subsequently overridden, for example, by a user using interface 204. Automated control module 232 may detect that the deployed scheduling template parameters have been overridden based on received operating data sent by the device. In response to detecting that a scheduling template has been overridden locally at a device, automated control module 232 may cause the device to revert back to the scheduling template by sending an operating command to the device. In an embodiment, automated control module 232 may be configured to generate one or more system alarms and user notifications in response to detecting that a scheduling template is overridden locally at a device.

In an embodiment, automated control module 232 may comprise generic scheduling templates for various types of energy management devices for use as a starting point in configuring certain energy management device types. For example, automated control module 232 may store a generic scheduling template for each of a thermostat, intelligent electrical outlet devices, and a lighting control device. Automated control module 232 may also comprise one or more default scheduling templates for different business types that may be selected by a user and deployed to one or more devices. For example, a default scheduling template may be provided for retail chain stores another template for fast-food chains. In some embodiments, the machine learning techniques disclosed in other sections herein may be used to select and set the default scheduling technique. This approach may be used for a single site, or across multiple sites. For example, thermostat setting and schedule data that is machine learned as further described herein, with respect to a first site, may be used to select or determine, and install, a default schedule in thermostats of a second site.

In an embodiment, automated control module 232 comprises a faults and alarms subsystem. In an embodiment, a fault condition may be detected by automated control module 232 and alarm may be generated based in response to one or more conditions detected at an individual site based on collected data including, for example, a temperature setting not being met, an energy management device failing to respond, or other defined fault conditions. In an embodiment, in response to automated control module 232 detecting the occurrence of a fault condition, one or more alarm messages may be generated and sent to designated users such as, for example, an email sent to a site manager, SMS message to a technician, or an visual alert displayed in portal 224 to particular users.

3.2.4.2 Analytics

In an embodiment, analytics module 234 mines the data collected by data collection module 226 across site groupings and is configured to provide statistical views detailing patterns in the data, also referred to herein as analytics. The statistical views generated by analytics module 234 may be used to understand historical energy usage patterns and trends in order to improve energy management performance across a customer's sites.

In this context, a statistical view comprises one or more data values generated from data collected and stored by data collection module 226 and using one or more statistical methods. In an embodiment, generated statistical views may be displayed to a user using portal 224 using any number of visual data representations including tables, spreadsheets, charts, graphs, or any other data representations. In an embodiment, one or more default statistical views may be stored by analytics module 234 and users may additionally specify one or more custom statistical views using portal 224. Statistical views specified by a particular user may be saved for later use by the user or for use by other users. In an embodiment, statistical views may be made available to users in a downloadable format that a user may download and store locally such as, for example, spreadsheet files, text documents, or in other file formats.

Analytics module 234 may generate statistical views of the collected data on a number of different levels including performance analyses of particular energy management devices, particular sites, site groupings, an entire company, and across companies and particular industries. Analyses performed by analytics module 234 on each of these levels may include statistics such as kilowatt and/or thermostat usage, degree days (heating and/or cooling), electrical dollars spent, natural gas or heating oil dollars spent, total dollars spent, inside and/or outside air temperatures, occupancy rates, and luminous rates. Statistical views may be generated based on various time granularities such as per hour, per day, per month, etc.

In an embodiment, analytics module 234 may generate an energy management device efficiency measurement. An efficiency measurement provides a measurement of the management of energy management devices by human behavior as compared to automated controls. In an embodiment, an energy management device efficiency measurement is measured as a percentage of how effectively energy management devices are being managed relative to fully automated controls, where 100% automation of an energy management device would be measured as 100% efficiency.

In one embodiment, analytics module 234 may generate statistical views of collected energy usage data based on site profile information such as, for example, the square footage of various sites, outside temperatures, and other site-specific information. In an embodiment, the site profile information may be used to generate statistical views that compare building efficiencies associated with various sites such as the average time required to reach certain temperatures, or the heat dissipation rate of particular sites.

In another embodiment, analytics module 234 may generate statistical views of energy usage data by comparing energy usage data collected across sites or site groupings within a particular company. For example, a statistical view may compare a particular site's kilowatt usage against the average of all company sites and/or the best company site, or compare a particular site's average inside and outside temperatures against the average inside and outside temperatures of various sites within the company.

In another embodiment, analytics module 234 may be configured to generate statistical views that are independent of company boundaries. For example, analytics module 234 may generate statistical views that compare a particular company's daily kilowatt usage or any other similar metric against an average generated for similar company types, for companies in similar geographic or climate regions, or across all companies.

In an embodiment, analytics module 234 may generate one or more predictive statistical views based on trends derived from the collected data. For example, a statistical view may be generated that calculates predictive savings based upon a calculated number of cooling and heating degree days in the past year. A heating or cooling day is a value based on the difference between the outside air temperature and a cooling or heating set point for a given day and may be used as an approximate measure of an HVAC unit's energy requirements. In the example, this figure may be used to estimate increases or decreases future energy bills based on recent cooling and heating day trends.

In an embodiment, analytics module 234 may generate statistical views that incorporate other data sets, such as data obtained from external data sources 240, in order to provide analyses of energy usage as it relates to other event data. For example, one or more statistical views may be defined that validate billing charges, generate billing reports, and generate other trending and statistical billing statistics based on stored utility billing information. In another embodiment, analytics module 234 may generate statistical views that compare temperature information recorded for a particular site with the sales information at the site, providing a customer with possible indications of the impact of temperature settings and resulting comfort levels at particular sites on purchasing habits, and enable customers to adjust their energy usage configurations accordingly.

In an embodiment, third-party users may access various system components via API 238. In an embodiment, API 238 may provide controlled third-party access to various statistical views, collected energy usage data, device templates, and other information. In this manner, the data collected and stored in energy management service unit may be provided as a data asset to various third-parties including industry analysts, HVAC manufacturers, utility providers, and others.

3.2.4.3 Behavioral Learning

In an embodiment, energy management applications 230 further comprise a behavioral learning module 236 that includes set of algorithms that are programmed to determine learned behavior for use as a basis for selecting thermostat schedules and communicating the schedules to thermostats. In this context, learned behaviors refer to inferences about user and energy management device behavior drawn from the data collected by data collection module 226. Learned behaviors detected by behavioral learning module 236 may be used assist users in further fine-tuning the control of scheduling template configurations, and to provide intelligent algorithms to control device operation. In an embodiment, learned behaviors may be further analyzed to determine company-wide and industry-wide best practices that may be used as benchmarks for energy efficiency in other modules across the system.

In an embodiment, one example behavioral learning algorithm that may be implemented by behavioral learning module 236 is a floating base temperature algorithm for thermostat devices. Rather than operating strictly according to specified heating and cooling setpoints, a floating base temperature algorithm allows the inside temperature setpoint set by particular thermostat device to fluctuate, or float, based on the apparent temperature at which the device is located. In some embodiments, outside temperature and the humidity index measured at the site are used as inputs to the floating base temperature algorithm.

As an example implementation of a floating base temperature algorithm, consider a thermostat device initially configured with a floating base temperature of 70 degrees and further configured to increase or decrease the inside temperature setpoint in response to corresponding increases and decreases in the outside temperature. Behavioral learning module 236 may program a rule, for example, in an scheduling template implemented by a thermostat device that that causes the thermostat device to increase the inside temperature setting in response to detecting that the outside temperature at the site exceeds a 20 degree difference from the inside temperature setting, with the thermostat device increasing the inside temperature setting one degree for every degree over the 20 degree difference. In an embodiment, a second rule may be programmed in the scheduling template that allows the inside temperature setting to increase only up to a maximum adjusted setting, for example, up to five degrees. In this example, if the outside temperature goes up to 93 degrees, the inside temperature setting will "float" upwards to 73 degrees. The inside temperature setting may continue to increase until the inside temperature reaches the set maximum of 75 degrees, in which case the second rule causes the thermostat device to hold at that temperature. In an embodiment, behavioral learning module 236 may implement floating base point algorithms based on fixed rules configured by a user for particular sites, or based on learned optimization points based on intercompany and/or industry wide comparable site analyses.

In another embodiment, behavioral learning module 236 may interface with portal 224 to present to a user various representations of temperatures settings other than degree numbers. For example, rather than presenting to a particular user using portal 224 an option to configure the temperature setting of a thermostat device to particular degree values, the user may be presented with a temperature scale that presents options that range from comfort at one end and energy cost savings at the other end. Behavioral learning module 236 may then translate a user's selection along the presented scale into an actual temperature value based analyses performed about the cost to heat or cool a site to a particular temperature.

In another embodiment, behavioral learning module 236 may comprise an algorithm for pre-conditioning particular sites based on user settings. A pre-conditioning algorithm may include determining optimal device settings for pre-heating or pre-cooling a site to a desired temperature by a designated time. For example, a user may be aware of a particular time of day that customers or employees typically arrive at a particular site and desire that the site be cooled to a particular temperature by that time each day. In an embodiment, behavioral learning module 236 may determine a time that an energy management device 202 is to begin a cooling or heating operating based on historical data and determining an approximate time it takes to cool the site to the desired temperature. The determined time may be specified in a scheduling template sent to the thermostat device. In this manner, computation of pre-conditioning settings by behavioral learning module 236 prevents excess energy usage by a cooling or heating schedule being set too soon.

In another embodiment, behavioral learning module 236 is configured to implement various diagnostics and alarming algorithms based on analyzing statistical trending data. Behavioral learning module 236 may evaluate collected data associated with particular energy management devices, particular sites, or with an entire company. For example, in response to the detecting initiation of a particular temperature setting by a thermostat device at a particular site, behavioral learning module 236 may monitor the time period required heat or cool the site to the particular temperature setting.

In an embodiment, behavioral learning module 236 may store this information and the information may be analyzed over time in order to evaluate the condition of an HVAC unit at the site. As the performance of the HVAC unit degrades over time, that degradation may be measured based on the time measurements and reported to the user. In other embodiments, HVAC degradation may be analyzed based on measuring overall unit run time, and actual usage of thermowatts and/or kilowatt hours. In an embodiment, an alarm may be set to alert the user that the HVAC is underperforming by a specified percentage relative a base point performance level.

In another embodiment, alarms may be detected and reported by behavioral learning module 236 based on the occurrence of particular short-term trending events. For example, behavioral learning module 236 may detect that at a particular site the time period to reach a particular temperature setting is exceptionally long, or that a particular site is unable to sustain a temperature because, for example, a window at the site is left open, or the HVAC unit is broken. In response to the detection of a specified alarm event, behavioral learning module 236 may be configured to generate a specified one or more user alerts.

In another embodiment, behavioral learning module 236 is programmed to implement an artificial neural network that can be trained, for a plurality of sites or on a per-site basis, to record data values specifying external factors and site-specific settings or comfort factors and to reflect a probabilistic output specifying a set of temperature settings for a particular thermostat of a site, or a group of thermostats of a site or plurality of sites. After a period of training the neural network, which may be accomplished using approximated or constructed data rather than actually waiting out a long training period, current environmental and comfort values can be input to the neural network which then will yield a probabilistic set of thermostat values from which specific settings can be selected and directly sent to a particular thermostat or set of thermostats at a particular site.

FIG. 8 illustrates data structures and data processing steps representing an algorithm that may be programmed to implement a neural network embodiment of the behavioral learning module. In an embodiment, behavioral learning module 236 is programmed to process data in a training stage 801 and an active processing stage 820 using a Bayesian neural network programmed with values of a plurality of random variables having conditional dependencies, represented as nodes in an acyclic graph and producing as output a set of thermostat setting values associated with an adjustable probability value indicating a probability that those setting values would be used given the values of the random variables. While FIG. 8 depicts a process that implements a Bayesian neural network, for purposes of illustrating a clear example, other embodiments may use other machine learning techniques such as supervised machine learning.

In the training stage 801, behavioral learning module 236 is programmed to receive values for a plurality of data items from sites 102, 108 and other sites, such as a season identifier 802, season factor data 804, current external temperature local to site 806, and a site ID 809; each of these values may be timestamped with the then-current date and time, as indicated by timestamp values 808. In an embodiment, season identifier 802 specifies a season such as WINTER or SUMMER; season factor data 804 comprises a plurality of data values for winter factors or summer factors and the like, as described more fully herein with respect to FIG. 5; current external temperature local to site 806 specifies a then-current external temperature for a particular site, such as the outside ambient air temperature; and site ID 809 uniquely identifies a site that is the source of the other data values. Each of the foregoing data items represents a value of a random variable that may be represented as nodes in a directed acyclic graph 810 of an artificial neural network; in one embodiment, links of such nodes represent and are marked with a value indicating complete conditional dependence that essentially binds a particular set of the random variable values to a particular site at a particular timestamp.

Concurrently or near in time to receiving the values of the random variables, the behavioral learning module 236 also receives data indicating the then-current thermostat setting values 812 for one or more thermostats at the site that contributed the values of the random variables, and those current thermostat setting values are recorded in the neural network as one probabilistic output. Essentially, the current thermostat setting values 812 are linked by a probability value to the values of the random variables that were present at the time the thermostat(s) had the specified thermostat setting values. Assume that input the random variable values and thermostat setting values are as follows:
{WINTER, 30 DEG, 01-JAN-2016 08:00, PEORIA_IL} {06:00,66,08:00,68,18:00,64}
{WINTER, 38 DEG, 02-JAN-2016 08:00, PEORIA_IL} {06:00,66,08:00,68,18:00,64}
{WINTER, 45 DEG, 03-JAN-2016 08:00, PEORIA_IL} {06:00,66,08:00,68,18:00,64}

This data indicates that identical thermostat setting values were used on three different days in January at the same site but with different outside temperatures at the same time of day. As a result, the thermostat setting value 812 for this site and input values would have a 100% probability of being {06:00,66,08:00,68,18:00,64}. In contrast, if any of the thermostat setting values noted above had varied on different days, then the probability of a setting of {06:00,66,08:00, 68,18:00,64} would be some value less than 100%. As the neural network is trained, the probability value that links the thermostat setting values 812 to the graph 810 may be adjusted to reflect an actual probability that specified random variable values will produce a particular discrete set of thermostat setting values.

Any number of sets of the values of the random variables may be received and loaded into the graph 810 at the same time, or over real time intervals, as part of training stage 801. There is no minimum or maximum number of sets of random variables that are needed to produce useful results for the thermostat setting 812, but in practice, more comfortable results using thermostats may be obtained if each site contributes about one month of historic data to the training stage 801. Further, while the output of the Bayesian neural network is depicted as thermostat setting values 812, which may be used to determine schedule data to transmit to device 110 as further described below, in other embodiments the output may be the schedule data itself.

Turning now to active processing stage 820, in an embodiment, the behavioral learning module 236 is programmed to process a set of current data values against the neural network on a daily, hourly or other periodic basis as needed to set values for a thermostat, for example, device 110 of site 108. As an example, assume that a dataset 822 of current external factor values is received for a site 108. The dataset 822 may be received using any data communication mechanism that is otherwise disclosed herein, and may be received via polling, pushing or posting, or other data collection or messaging techniques, which are not critical to an embodiment. All that is needed is that the behavioral learning module 236 obtains, electronically, a set of current data values for the site that specify several or all of: the season, season factors, current external temperature, timestamp values, and a side identifier.

This data is applied programmatically to the neural network as indicated by path 824, for example, by walking the graph 810 using values in the dataset 822 to result in receiving output at path 826 comprising an output set 828 of thermostat setting values and corresponding probabilities. In other words, by effectively matching values in the dataset to existing nodes in the graph 810 and following links in the graph, a set of one or more thermostat setting values 812 with corresponding probability values will be obtained and stored, at least transiently, as the output set 828.

At step 830, in an embodiment, the output set 828 is inspected and a particular set of thermostat setting values having the highest associated probability value is selected. These setting values are digitally transmitted directly to one or more particular devices 110 of the site 108. Additionally or alternatively, the output set 828 may be transformed into a schedule of a plurality of days, times, and settings to be transmitted to the device 110. Or, the output set 828 may be used to select a particular schedule from among a plurality of stored schedules, and the selected particular schedule may be transmitted to the device 110. The structure or format, and selection process, for schedules may occur as described in other sections herein pertaining to selecting schedules and providing them to devices.

Using this approach, the values actually experienced at a particular site 108, which reflect not just objective ambient external temperature conditions but also subjective perceptions of comfort as reflected in thermostat setting values, may be digitally recorded and represented using an artificial neural network that is effectively capable of learning over time what thermostat setting values to predict and recommend given a particular input set of actual current condition values. The resulting output thermostat setting values may be probabilistically selected and then sent directly to thermostats or other environmental devices at a particular site. Consequently, the accuracy and efficiency of external automatic control of thermostats or other environmental devices is significantly improved as compared to past approaches.

4.0 Environmental Learning

In an embodiment, energy management service unit 130 can implement environmental learning to improve thermostat settings to improve the comfort of the occupants and to control energy consumption. Environmental learning is used to modify thermostat heating and cooling settings based on environmental factors, rather than on behavioral factors attributable to occupants at the site. Examples of environmental factors include, but are not limited to, season, external temperature, humidity, wind velocity, precipitation, snow, cloud cover and so forth. These environmental factors can change people's perception of the outdoor temperature. For example, in warm weather, increased humidity can make the present temperature feel hotter than the actual temperature. In these instances, a cooling setpoint of a thermostat can be set to a higher temperature. In cold weather, wind velocity can make the outside feel colder than it actually is. In these instances, a heating setpoint of a thermostat can be set to a lower temperature. Accounting for these changes in perception enables the system disclosed herein to achieve greater efficiency by adjusting interior temperature to levels that typically prevent individuals from feeling the need to manually change the set temperature at one or more energy management devices 202. Consequently, embodiments can achieve increased energy savings.

Further, at some sites, connectivity between the Wi-Fi subsystem 210, the Internet 120, and the energy management service unit 130 can be unpredictably lost for extended periods of time. For example, a Wi-Fi connection can be weakened when doors are closed for the evening, or access points may have been positioned in locations that result in a chronically weak signal, resulting in intermittent connectivity. At some sites, available Wi-Fi service is unreliable, and repairs to restore Wi-Fi service can take days. In embodiments, the energy management service unit 130 is configured or programmed to download a multi-day schedule of setpoints to the energy management devices 220. Therefore, a loss of connectivity for a time period of up to many days will not cause the energy management devices 220 to operate incorrectly.

Figure 4:
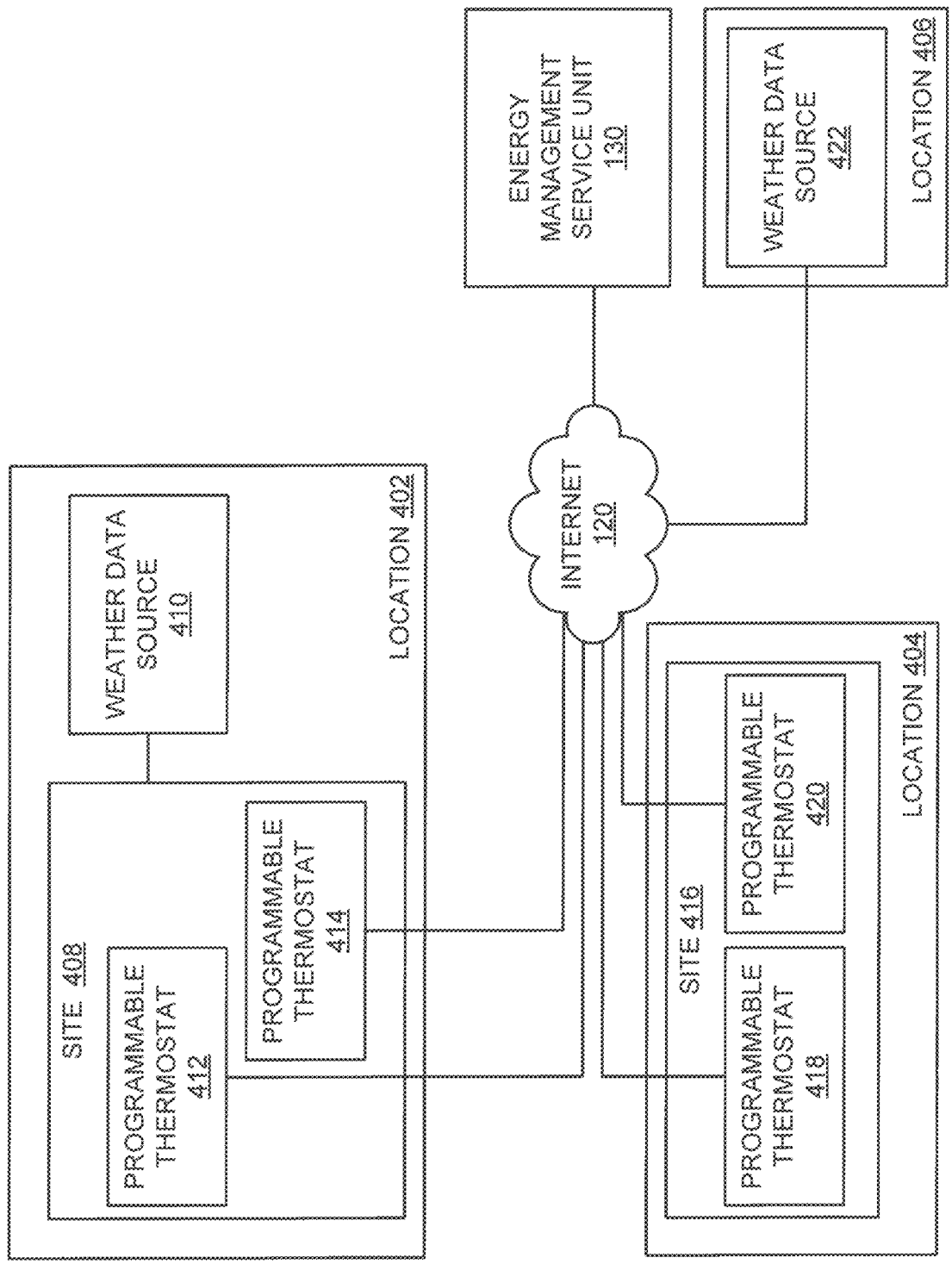
FIG. 4 is a block diagram that illustrates an overview of an energy management system that includes an energy management service unit in relation to a plurality of sites that each include one or more programmable thermostats.

FIG. 4 illustrates an overview of an energy management system that includes an energy management service unit in relation to a plurality of sites that each include one or more energy management devices, such as Wi-Fi-enabled programmable thermostats. The energy management system comprises the energy management service unit 130 in communication via the Internet 120 with programmable thermostats and/or weather data sources at locations 402, 404, and 406. The locations are distinct geographical areas and are each defined by a set of geographical boundaries. The locations may comprise one or more sites, each having one or more programmable thermostats or other energy management devices.

For purposes of illustrating a clear example, in FIG. 4 a site 408 is located within the boundaries of the location 402. The site 408 may include programmable thermostats 412, 414 that control heating and cooling for different portions of the site 408. The programmable thermostats 412, 414 are connected to the Internet 120 via a Wi-Fi connection or other network connection. The programmable thermostats 412, 414 at the site 408 can be programmed differently based on their location within the site 408. For example, if the site 408 is a restaurant, the programmable thermostat 412 can be located in the kitchen, near stoves and ovens that heat the area. To compensate for the heat produced in the kitchen, the programmable thermostat 412 may be set to heat and cool at certain temperatures that are significantly different from the setpoints for programmable thermostats in other locations. Continuing the restaurant example, the programmable thermostat 414 can be located in a dining area of the restaurant, where patrons prefer room temperature. To maintain room temperature in the dining area, the programmable thermostat 414 may be set to heat and cool at different temperatures than those set by the programmable thermostat 412 in the kitchen.

Regardless of their specific location in the site 408, the programmable thermostats 412, 414 are set to a heating setpoint and a cooling setpoint, maintaining the temperature in the respective areas of the site at or close to the setpoints. To determine the setpoints, the apparent temperature at the location 402 is determined based upon a season value indicating the season and weather data. The season value may indicate, for example, spring, summer, autumn, winter, or there may be localized definitions for season or conditions. In an embodiment, another factor that may be used in determining an automated schedule may be restaurant type. For example, in the case of a fast food restaurant, patrons typically are in the restaurant only for a few minutes, so their perception of comfort is influenced more strongly by the outside apparent temperature, as compared to other restaurant types. For a fast casual restaurant, patrons may be in the restaurant for a slightly longer time than a fast food restaurant, so they are less influenced by the outside apparent temperature. For a sit-down restaurant, patrons typically are in the restaurant for a considerable time, e.g., more than 30 minutes, and in that time period patrons will have acclimated to the inside temperature and will be only minimally affected by the apparent outside temperature.

At some locations, such as location 402, weather data is obtained by a co-located weather data source 410 (for example: local temperature, humidity sensors). The weather data source 410 can provide all or a portion of the weather data used to calculate the apparent temperature at the location 402. The weather data source 410 may communicate with the energy management service unit 130, weather data source 422 or other weather data sources, and programmable thermostats 412, 414 via a Wi-Fi network at the location 402 that connects to the Internet 120. In some instances, the co-located weather data source 410 can be a weather station such as those used by the National Weather Service to collect data including temperature, wind, and precipitation data, or a server computer associated with such stations or sources.

At second location 404 that is geographically distinct from the location 402, a site 416 has programmable thermostats 418, 420. The programmable thermostats 418, 420 can communicate with the energy management service unit 130 via a Wi-Fi connection to the Internet 120. The programmable thermostats 418, 420 may be set according to the same automated schedule or to different automated schedules based on their locations within site 416.

Location 404 does not include a weather data source 410. Instead, the programmable thermostats 418, 420 can be set based on weather data obtained from a weather data source 422 at a third location 406 or from weather data source 410 at location 402. Location 406 is geographically distinct from locations 402, 404. In some instances, location 406 can be near location 404. For example, if location 404 is in Morgan Hill, Calif., location 406 can be 30 miles to the north in San Jose, Calif. In other embodiments, location 406 can be remote from location 404 and/or location 402. For example, location 406 can be in Cleveland, Ohio, 2,500 miles east of Morgan Hill, Calif.

The weather data service 422 at location 406 can be a national weather service or corporate weather service that provides weather data including current conditions and/or weather forecasts for a plurality of locations, including location 402, 404. One example of a weather data source 422 is WEATHER UNDERGROUND, by The Weather Channel, LLC of San Francisco, Calif. The weather data source 422 comprises an API accessible via the Internet 120 by the energy management service unit 130. The energy management service unit 130, when connected with the weather data source 422, can obtain current weather conditions and/or a forecast of weather conditions at locations 402, 404. The forecast can have a duration of 10 days or more.

Figure 5:
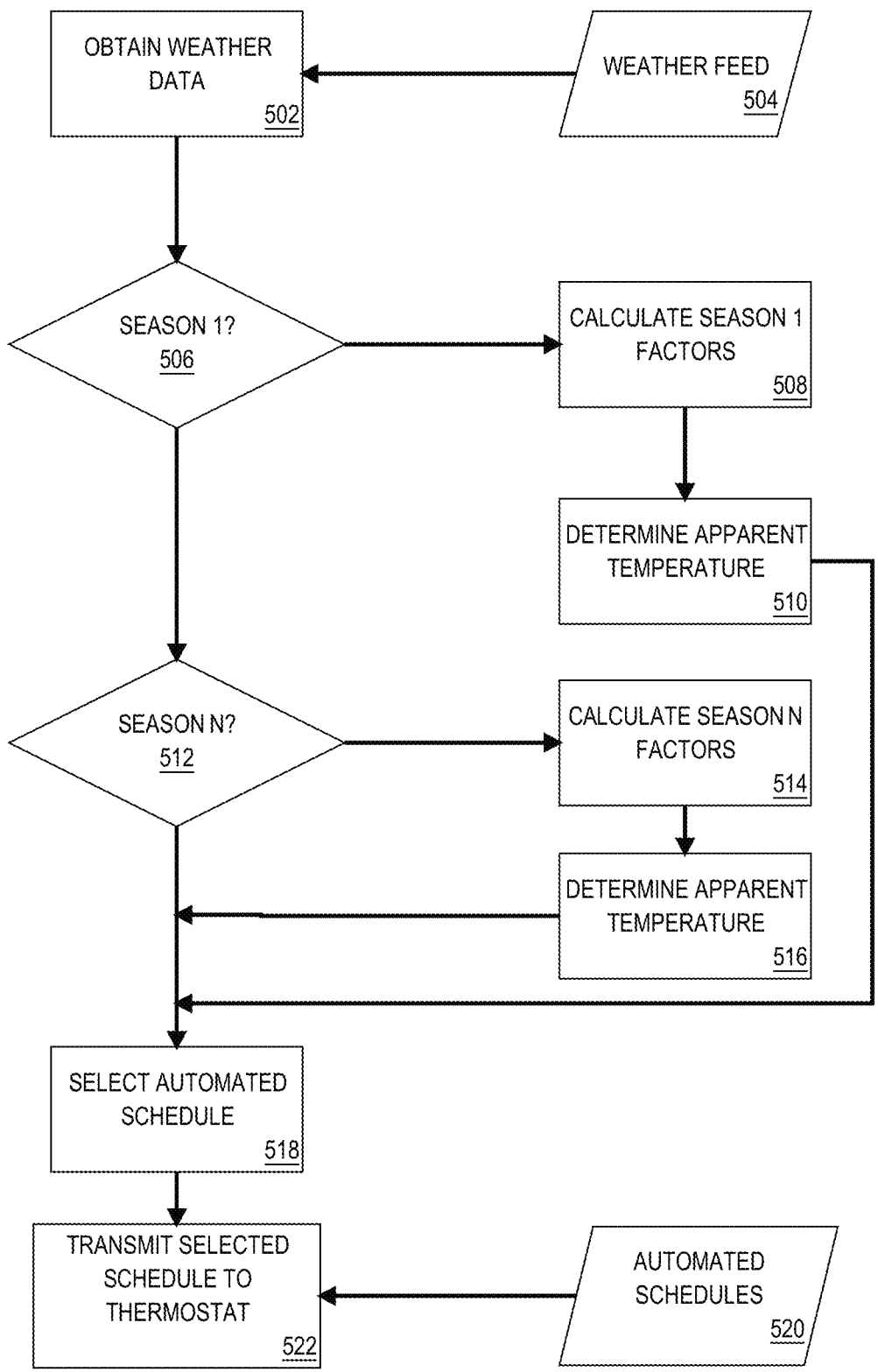
FIG. 5 is a flowchart that illustrates a process for transmitting an automated schedule to a thermostat.

The foregoing illustrates various examples of arrangements of sites, locations, weather data sources and weather data services and any of the examples may be used in various embodiments, alone or in combination. In an embodiment, energy management service unit 130 operates under program control or is otherwise configured to execute computer-implemented processes. FIG. 5 is a flowchart that illustrates an environmental learning process for selecting and transmitting an automated schedule to a thermostat. The process of FIG. 5 can be performed by, for example, the energy management service unit 130 and, in particular, by the analytics module 234 and the automated control module 232, and provides an example of an algorithm that may form the basis of programming instructions or configuration of programmed logic to control these functional elements.

4.1 Weather Data Acquisition

In an operation 502, weather data is obtained as a weather data 504 for a location. The weather data comprises a forecast of weather at one or more locations at which sites (e.g., sites 408, 416) are situated. The weather data including current weather conditions may be obtained from a co-located weather data source such as weather data source 410. The weather data includes information about current or forecasted weather conditions including, but not limited to, temperature (for example an anticipated high temperature and an anticipated low temperature), wind speed, wind direction, wind chill, humidity, precipitation, severe weather alerts, tide information, time of sun rise, time of sun set, air quality index, allergen index (for example pollen, dust, hay fever), frost warnings, amount of snowfall, cloud cover, snow depth, dew point, cloud cover, pressure, ultraviolet index, and lunar phase. The weather data can include a forecast for an extended duration of time, including up to 10 days.

4.2 Apparent Temperature Calculation

Upon obtaining the weather data, seasonal information for a particular location is determined, as described in connection with operation 506 and operation 512. For example, in operation 506, the analytical module 234 determines, based on the current date or another calendar day, for example, whether the particular location is in a season 1, where season 1 may refer to a particular season that is defined for the particular location. Season 1 can be, for example, a winter season, but can be flexibly defined using any suitable start and end dates or date ranges and can be given any name to use as a reference. For example, November 1 through February 28 may be called "Winter Schedule" for sites located in the northern hemisphere but sites located in the southern hemisphere may associate a different date range with the "Winter Schedule" season name. Additionally, the system allows any number of "seasons" N to be defined (where N is a positive integer). Thus, in operation 512, season N may refer to a summer season, or a spring or fall season, or a shoulder season that falls between two seasons, or a rainy or wet season, or a dry season, and many other seasons recognized by particular locations. The determination of a season can be based on a stored value corresponding to the season 1 date range. In some embodiments, the season determination may be based on a calendar day included in the forecast. That the current season at the particular location is season 1 can also be determined using one or more algorithms, such as by comparing forecasted weather conditions to one or more threshold data values.

If the season at the particular location is determined to fall within or correspond to the date range specified for season 1, the process proceeds to operation 508. In operation 508, the analytics module 204 selectively accesses certain data within the weather data that has been observed to most affect people's perception of temperature. For example, if season 1 is defined as winter, the wind speed causes a phenomenon termed wind chill that often causes people to perceive temperatures as colder than the actual temperature, and thus wind chill may be a factor that is included in the apparent temperature calculations during season 1, but may not be included in the apparent temperature calculations during other seasons. Similarly, if season 1 is defined as winter, other factors, such as the allergen index, may have no effect on the perceived temperature and thus may not be factors that are included in the apparent temperature calculations during season 1.

In some instances of operation 508, additional factors relevant to season 1 can be calculated based on weather data included in the forecast. In locations such as the Pacific Northwest or the Great Lakes States, the presence of precipitation or cloud cover can cause people to perceive the temperature as being colder than it actually is. For example, some locations may experience large swings in temperature over a short period of time. The anticipated temperatures included in the forecast can be used to determine a swing in temperature. The swing in temperature is then compared to a threshold to determine whether the swing is significant enough to alter people's perception of the temperature. For example, a swing from a temperature of 20 degrees to a temperature of 50 degrees may cause people to perceive 50 degrees as warmer than if the previous daytime temperatures were approximately 50 degrees or higher.

In an operation 510, the season 1-relevant factors are used by the analytics module 234 to determine an apparent temperature. The apparent temperature is the temperature that the weather "feels like" to a person. The apparent temperature can be calculated in a variety of ways including ways known to those skilled in the art such as the wind chill equation. In some instances, such as in cases where wind chill is a factor, tables can be accessed to look-up the apparent temperature. In cases where additional factors are considered, the wind chill can be adjusted once calculated. For example, if the wind chill is at 56 degrees, and precipitation is forecasted, the apparent temperature can be shifted to account for the effects of the precipitation, such as by shifting the wind chill temperature to result in an apparent temperature of 54 degrees.

The apparent temperature can be determined at intervals over a duration of a forecast, such that the operation 510 results in a sequence of forecasted apparent temperatures. Intervals for determining the apparent temperature may vary in different embodiments and may range from minutes to hours. Once the apparent temperature(s) are determined, the process continues to operation 518.

If the determination of operation 506 resulted in a determination that the location was not in the winter season, the analytics module 234 further determines whether the particular location is in the season N (for example, the summer season) in operation 512. The determination that it is the season N can be made based on a value corresponding to a date range associated with season N, which is stored in association with the particular location or as described in connection with operation 506.

If the current season is season N, in operation 514, data is selectively accessed from the weather data to calculate one or more season N factors. The data is selectively accessed according to instructions stored in the analytics module 234 that identify the one or more season N factors. For example, if season N is the summer, higher humidity can cause the apparent temperature to be higher than the actual temperature. Further, if season N is the summer, wind velocity can lower the apparent temperature.

In operation 516, the analytics module 234 determines the apparent temperature based on the season N factors of operation 514. The apparent temperature can be based on a calculation performed by the analytics module 234 such as a heat index calculation. In some embodiments, such as with heat index based on temperature and humidity, the apparent temperature is determined using a look-up table.

If the determination in operation in 512 is that it is not season N, further determinations based on others of the N defined seasons can be made until a season is identified that matches the current season or date range. When the current season is identified, season-specific factors are calculated as described in connection with operations 508, 514 and an apparent temperature is determined as described in connection with operation 510, 516.

In other embodiments, if the determination of operation 512 is that it is not season N at the particular location, a default season is identified. In some instances, this default season is referred to as a "shoulder season" and can encompass both fall and spring. In some embodiments, additional or different seasons can be added to the process of FIG. 5. For example, determinations like those made in operations 506 and 512 for spring and fall can be added. In some geographical areas that do not experience summer and winter, other seasons can be substituted for season N in operation 512 and season 1 in operation 506, such as "dry season" and "wet season". In these instances, season-specific factors are calculated as described in connection with operations 508, 514 and an apparent temperature is determined as described in connection with operation 510, 516. As noted above, shoulder seasons, wet and dry seasons, and other types of seasons can be defined in the system by, for example, associating a season name with a date or a date range, at least one geographic location in which the season applies, and the season-specific weather factor(s) that are relevant to the apparent temperature calculation during the season at that location.

4.3 Selection of Automated Schedule

In an operation 518, an automated schedule is selected by the automated control module 232. The automated control module 232 obtains automated schedules 520 from a computer memory. The automated schedule can be selected according to a particular location or a particular device within the location, the season, and the apparent temperatures determined in operation 510 or in operation 516. Each particular location or device within the location can have separate automated schedules to account for regional preferences. For example, at the same apparent temperature, Texans may prefer cooler indoor temperatures than people in the Midwest. Thus, for locations in Texas, automated schedules having lower setpoints are selected while, for the Midwest, automated schedules having higher setpoints are selected.

To select an automated schedule, the apparent temperatures are compared to a plurality of temperature ranges associated with the automated schedules. In instances where a forecast contains apparent temperatures spanning temperature ranges, more than one automated schedule can be selected.

To illustrate, examples of automated schedules for programmable thermostats are provided in FIG. 6. The automated schedules are divided by the number of defined seasons. For example, if the only defined seasons are winter and summer, then the automated schedules may be divided into summer schedules 602 and winter schedules 604. However, if there are N seasons defined, then automated schedules can be established for each of N defined seasons. These seasonal schedules further comprise automated schedules corresponding to ranges of apparent temperatures. For example, summer schedule 606 is associated with an apparent temperature range of 80 degrees to 90 degrees. The summer schedule 606, and the remaining automated schedules, comprise a plurality of times of day and, for each time of day 608, a heating setpoint 610 and a cooling setpoint 612. For example, in summer schedule 606, at 7:00 AM, the heating setpoint is set to 68 degrees and the cooling setpoint is set to 72 degrees. At 12:00 PM, when the apparent temperature is warmest, the heating setpoint is set to 70 degrees and the cooling setpoint is set to 74 degrees. This shift by two degrees compensates for the perception that the apparent temperature is warmer than it was at 7:00 AM and prevents people from feeling chilled when walking into a temperature-controlled site. At 6:00 PM, the heating setpoint is set to 55 degrees and the cooling setpoint is set to 90 degrees. This change is prompted by people leaving the site and no longer requiring as much heating or cooling, thus saving energy and its associated costs.

Referring now to summer schedule 614, for a higher range of apparent temperatures, the heating setpoints 610 and the cooling setpoints 612 are shifted upwards by two degrees (except at 6 PM). This shift compensates for people's perception that the apparent temperature is warmer and prevents occupants from feeling chilled when entering or remaining at the site.

Referring to winter schedules 604, the heating setpoints 610 and the cooling setpoints 612 are set to be lower than for the summer schedules 602. The lowering of the setpoints accounts for the perception that the outside apparent temperature is cooler than the inside temperate and prevent people from feeling overheated when entering the site. Comparing winter schedule 616 to winter schedule 618, winter schedule 618 has lower setpoint to account for lower apparent temperatures.

Based on a given forecast, where a sequence of apparent temperatures are determined, a plurality of automated schedules can be selected. The automated control module 232 can generate instructions that instruct the programmable thermostats to switch from one automated schedule to another based on the change in apparent temperature occurring over an extended period of time, such as seven days.

4.4 Transmission of Automated Schedule to Thermostats

In an operation 522, the selected automated schedule(s) are transmit to the programmable thermostat. The programmable thermostat can store automated schedules for up to the duration of the forecast. For example, if the duration of the forecast is seven days, then the programmable thermostat thus only needs to connect to the energy management service unit 130 via the network once every seven days (consequently, the system can tolerate periods in which there is no network connectivity for several days). By transmitting at a given time automated schedules covering a period of several days, the wireless connectivity of the programmable thermostats at the various sites can be interrupted for days at a time without comprising energy management or people's comfort levels while at the site.

5.0 Implementation Mechanisms—Hardware Overview

Figure 7:
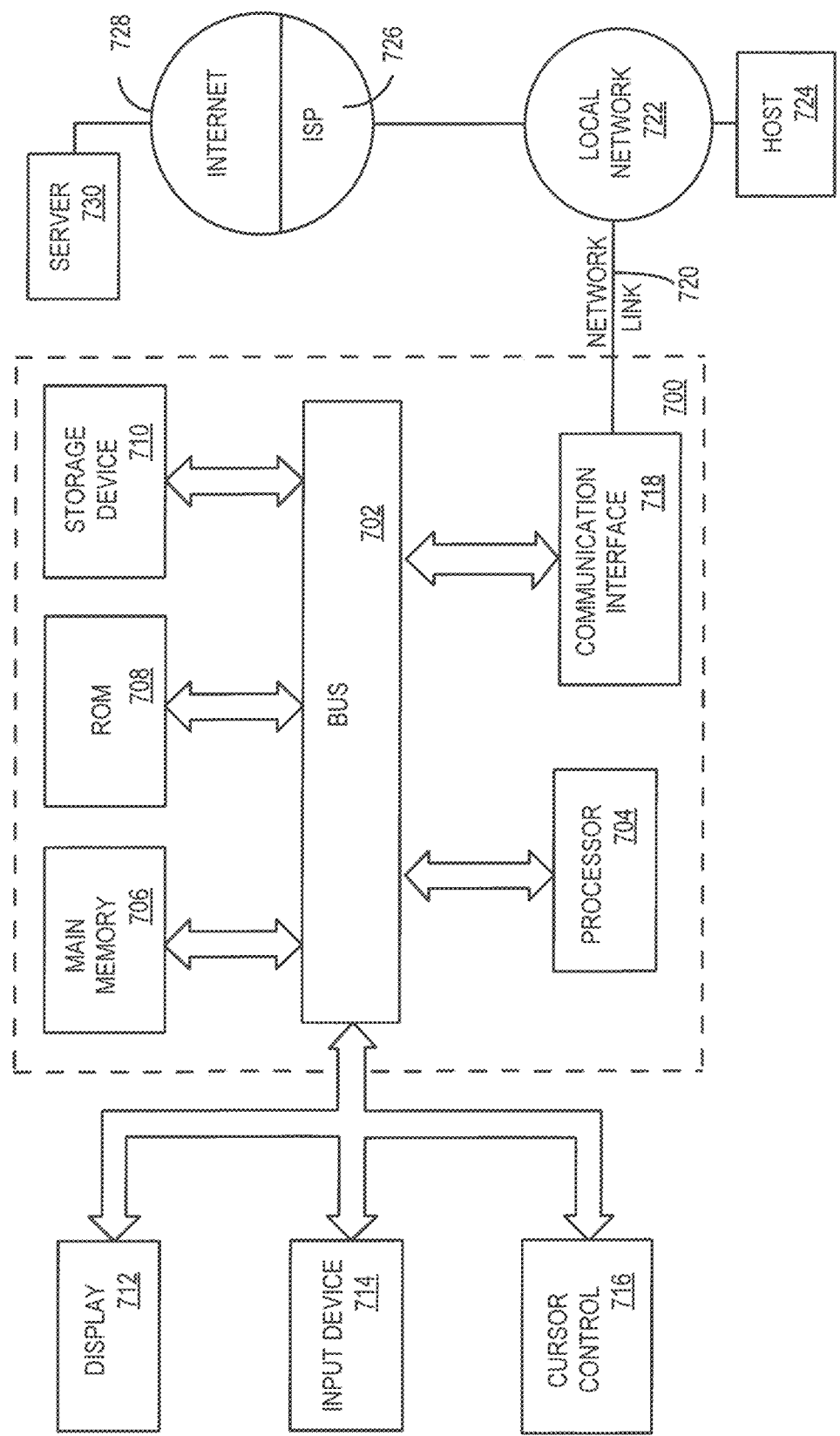
FIG. 7 illustrates an example computer system that may be used to implement aspects of an embodiment.

FIG. 7 is a block diagram that illustrates a simple example of a computer system 700 upon which an embodiment of the invention may be implemented. Other implementations include cloud-based implementations that use, for instance, an AMAZON-based infrastructure or other web-based hosting service.

Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

What is claimed is:

1. A data processing system, comprising:
   an energy management service unit comprising a computer and a network interface that is configured to be coupled using a data network, and directly without passing through a building management system, to a plurality of energy management devices located at a plurality of different geographically distributed sites, each of the sites having a different energy management device;
   an analytics module in the energy management service unit that is programmed to obtain, via the data network, a plurality of weather data from a plurality of different weather computers that are at locations relating to the sites, and including at least first weather data of a location relating to a first site of the plurality of sites and comprising one or more outdoor temperature values, and programmed to include in an apparent temperature of the first site a first factor calculated using certain current data within the first weather data and selected according to a season value indicating a season associated with the first site, the apparent temperature adjusted by a second factor determined using certain forecasted data within the first weather data;
   a behavioral learning module in the energy management service unit that is programmed to machine learn, through a programmed Bayesian neural network, probabilities of particular thermostat settings that are associated with input values of a plurality of random variable values associated with the first site;
   an automated control module in the energy management service unit that is programmed to select, from computer memory storing a plurality of digital automated schedules, a first automated schedule using the programmed Bayesian neural network and at least the apparent temperature, the season value indicating a season associated with the first site, and the probabilities and particular thermostat settings, and to electronically transmit the first automated schedule to a first energy management device of the plurality of energy management devices at the first site.

2. The data processing system of claim 1, wherein the analytics module is programmed to obtain current weather data at the first site as part of the first weather data.

3. The data processing system of claim 1, wherein the analytics module is programmed to obtain weather forecast data indicating a weather forecast at the first site as part of the first weather data.

4. The data processing system of claim 3, wherein the analytics module is programmed to determine, based on the weather forecast data, a plurality of apparent temperatures at the first site;
wherein the automated control module is programmed to select, from the computer memory, one or more second digital automated schedules based on one or more second apparent temperatures of the plurality of apparent temperatures and one or more second season values specifying a one or more second seasons at the first site and to electronically transmit the one or more second digital automated schedules to the first energy management device of the plurality of energy management devices at the first site.

5. The data processing system of claim 4, wherein the automated control module is programmed to determine, from the weather forecast data, a time of change from the apparent temperature to the second apparent temperature, to generate program instructions that instruct the first energy management device to use the first automated schedule until the time of change and to use the one or more second digital automated schedules after the time of change, and to electronically transmit the program instructions to the first energy management device.

6. The data processing system of claim 1, wherein the analytics module is programmed to obtain data indicative of temperature or wind velocity or precipitation or cloud cover or humidity or season or sunrise or sunset as part of the weather data.

7. The data processing system of claim 1, wherein the analytics module is programmed to determine the apparent temperature based on data indicative of temperature and wind velocity in combination with any of humidity or precipitation or snowfall or cloud cover.

8. The data processing system of claim 1, wherein the analytics module is programmed to determine the apparent temperature based on temperature and humidity in combination with any of wind velocity or precipitation or snowfall or cloud cover.

9. The data processing system of claim 1, wherein the first automated schedule comprises a plurality of times of day, and both a heating setpoint value and a cooling setpoint value in association with each of the times of day.

10. The data processing system of claim 1, wherein the plurality of digital automated schedules comprise at least two automated schedules for each season at the first site.

11. The data processing system of claim 1, wherein the input values of the plurality of random variable values associated with the first site include at least a particular apparent temperature at a particular time and a particular season value indicating a particular season at the first site at the same particular time.

12. The data processing system of claim 1, wherein the input values of the plurality of random variable values associated with the first site include three or more of: season identifier; season factor data; current external temperature local to the first site; site identifier.

13. A data processing method, comprising:
an analytics module in an energy management service unit that is programmed to obtain, via a network, a plurality of weather data from a plurality of different weather computers that are at locations relating to a plurality of sites, and including at least first weather data of a location relating to a first site of the plurality of sites and comprising one or more outdoor temperature values, and programmed to include in an apparent temperature of the first site a first factor calculated using certain current data within the first weather data and selected according to a season value indicating a season associated with the first site, the apparent temperature adjusted by a second factor determined using certain forecasted data within the first weather data;
using a behavioral learning module in the energy management service unit, machine learning, through a programmed Bayesian neural network, probabilities of particular thermostat settings that are associated with input values of a plurality of random variable values associated with the first site;
using an automated control module in the energy management service unit that is programmed to select, from computer memory storing a plurality of digital automated schedules, a first automated schedule using the programmed Bayesian neural network and based on at least the apparent temperature, the season value indicating a season at the first site, and the probabilities and particular thermostat settings, and to electronically transmit the first automated schedule to a first energy management device of a plurality of energy management devices at the first site.

14. The data processing method of claim 13, further comprising, using the analytics module, obtaining current weather data at the first site as part of the first weather data.

15. The data processing method of claim 13, further comprising, using the analytics module, obtaining weather forecast data indicating a weather forecast at the first site as part of the first weather data.

16. The data processing method of claim 15, further comprising, using the analytics module, determining, based on the weather forecast data, a plurality of apparent temperatures at the first site;
using the automated control module, selecting, from the computer memory, a second digital automated schedule based on a second apparent temperature of the plurality of apparent temperatures and a second season value specifying a second season at the first site and to electronically transmit the second digital automated schedule to the first energy management device of the plurality of energy management devices at the first site.

17. The data processing method of claim 16, further comprising, using the automated control module, determining, from the weather forecast data, a time of change from the apparent temperature to the second apparent temperature, generating program instructions that instruct the first energy management device to use the first automated schedule until the time of change and to use the second digital automated schedule after the time of change, and electronically transmitting the program instructions to the first energy management device.

18. The data processing method of claim 13, further comprising, using the analytics module, obtaining data indicative of temperature or wind velocity or precipitation or humidity or season or sunrise or sunset or snowfall or cloud cover as part of the weather data.

19. The data processing method of claim 13, further comprising, using the analytics module, determining the apparent temperature based on at least temperature and wind velocity.

20. The data processing method of claim 13, further comprising, using the analytics module, determining the apparent temperature based on at least temperature and humidity.

21. The data processing method of claim 13, wherein the first automated schedule comprises a plurality of times of day, and both a heating setpoint value and a cooling setpoint value in association with each of the times of day.

22. The data processing method of claim 13, wherein the plurality of automated schedules comprise at least two automated schedules for each season at the first site.

23. The data processing method of claim 13, wherein the input values of the plurality of random variable values associated with the first site include at least a particular apparent temperature at a particular time and a particular season value indicating a particular season at the first site at the same particular time.

24. The data processing method of claim 13, wherein the input values of the plurality of random variable values associated with the first site include three or more of: season identifier; season factor data; current external temperature local to the first site; site identifier.

* * * * *